US008732455B2

(12) United States Patent
Wong et al.

(10) Patent No.: US 8,732,455 B2
(45) Date of Patent: May 20, 2014

(54) METHOD AND SYSTEM FOR SECURING AGAINST LEAKAGE OF SOURCE CODE

(75) Inventors: Onn Chee Wong, Singapore (SG); Siew Keng Loh, Singapore (SG); Hui Yang, Beijing (CN); You Liang Wang, Beijing (CN)

(73) Assignee: Infotect Security Pte Ltd, Singapore (SG)

( * ) Notice: Subject to any disclaimer, the term of this patent is extended or adjusted under 35 U.S.C. 154(b) by 309 days.

(21) Appl. No.: 13/055,905

(22) PCT Filed: Jul. 25, 2008
(Under 37 CFR 1.47)

(86) PCT No.: PCT/SG2008/000271
§ 371 (c)(1),
(2), (4) Date: Nov. 21, 2011

(87) PCT Pub. No.: WO2010/011180
PCT Pub. Date: Jan. 28, 2010

(65) Prior Publication Data
US 2012/0042361 A1 Feb. 16, 2012

(51) Int. Cl.
*H04L 29/06* (2006.01)
(52) U.S. Cl.
CPC ..... *H04L 63/0227* (2013.01); *Y10S 707/99933* (2013.01)
USPC ........... 713/154; 713/160; 713/187; 713/188; 726/25; 726/4; 726/22; 726/24; 726/26; 707/70; 707/999.003; 715/234; 715/243; 709/224; 709/229; 717/114; 717/141; 717/154

(58) Field of Classification Search
CPC . H04L 63/0227; H04L 63/0428; G06F 21/51; G06F 21/563; G06F 21/57

USPC .......... 726/1, 4, 22, 25, 26, 24; 707/702, 709, 707/999; 717/126, 114; 713/188; 370/235
See application file for complete search history.

(56) References Cited

U.S. PATENT DOCUMENTS

| 6,697,791 B2 | 2/2004 | Hellerstein et al. ............. 706/47 |
| 6,947,933 B2 | 9/2005 | Smolsky ........................... 707/6 |

(Continued)

FOREIGN PATENT DOCUMENTS

| CN | 1510588 A | 7/2004 |
| EP | 1 750 388 A1 | 2/2007 |

(Continued)

OTHER PUBLICATIONS

Saul Schleimer et al., Winnowing: Local Algorithms for Document Fingerprinting, Jun. 9-12 SIGMOD (2003).*

(Continued)

*Primary Examiner* — Morshed Mehedi
*Assistant Examiner* — Sharon Lynch
(74) *Attorney, Agent, or Firm* — Seed IP Law Group PLLC

(57) ABSTRACT

Embodiments of the invention provide a method and a system of detecting source code in a message being sent over a digital communication network to secure against unauthorized leakage of source code. The message is intercepted on a network device, placed into a memory on the network device, and divided into one or more segments, wherein each segment includes a predetermined number of lines of text from the message. For each segment, one or more syntax rules of a programming language is applied to the segment and a predetermined number of context lines of text before the segment and/or after the segment, to determine which of the syntax rules of the programming language are matched in the segment. A determination of whether the text message includes source code is provided based on the syntax rules that were matched.

18 Claims, 13 Drawing Sheets

(56) References Cited

U.S. PATENT DOCUMENTS

| | | | |
|---|---|---|---|
| 6,947,985 B2 | 9/2005 | Hegli et al. | 709/224 |
| 6,981,155 B1 | 12/2005 | Lyle et al. | 713/201 |
| 7,028,183 B2 | 4/2006 | Simon et al. | 713/168 |
| 7,167,910 B2 | 1/2007 | Farnham et al. | 709/223 |
| 7,171,689 B2 | 1/2007 | Beavers | 726/22 |
| 7,194,464 B2 | 3/2007 | Kester et al. | 707/6 |
| 7,228,565 B2 | 6/2007 | Wolff et al. | 726/24 |
| 7,246,227 B2 | 7/2007 | Kissel | 713/22 |
| 7,315,891 B2 | 1/2008 | Donahue | 709/224 |
| 7,328,259 B2 | 2/2008 | Srinivasan et al. | 709/223 |
| 7,333,956 B2 | 2/2008 | Malcolm | 705/50 |
| 7,356,843 B1 | 4/2008 | Kingsford | 726/22 |
| 7,356,844 B2 | 4/2008 | Lyle et al. | 726/23 |
| 7,360,110 B1 | 4/2008 | Schmokel et al. | 714/1 |
| 7,668,812 B1* | 2/2010 | Riley et al. | 707/754 |
| 7,725,735 B2* | 5/2010 | Fox et al. | 713/188 |
| 8,051,372 B1* | 11/2011 | Sandhaus | 715/234 |
| 8,156,559 B2* | 4/2012 | Chen et al. | 726/25 |
| 8,176,333 B2* | 5/2012 | Aho et al. | 713/187 |
| 8,286,239 B1* | 10/2012 | Sutton | 726/22 |
| 8,286,250 B1* | 10/2012 | Le et al. | 726/25 |
| 8,434,151 B1* | 4/2013 | Franklin | 726/24 |
| 2002/0091942 A1* | 7/2002 | Cooper et al. | 713/201 |
| 2002/0103786 A1* | 8/2002 | Goel | 707/3 |
| 2003/0227399 A1* | 12/2003 | Varanasi | 341/59 |
| 2005/0114840 A1* | 5/2005 | Zeidman | 717/126 |
| 2005/0223354 A1* | 10/2005 | Drissi et al. | 717/114 |
| 2005/0262056 A1* | 11/2005 | Hamzy et al. | 707/3 |
| 2006/0259543 A1* | 11/2006 | Tindall | 709/203 |
| 2007/0192720 A1 | 8/2007 | Alsup et al. | 715/769 |
| 2007/0280112 A1* | 12/2007 | Zheng et al. | 370/235 |
| 2007/0299825 A1* | 12/2007 | Rush et al. | 707/3 |
| 2008/0071763 A1 | 3/2008 | Ferrenq et al. | 707/5 |
| 2008/0071813 A1 | 3/2008 | Nair et al. | 707/101 |
| 2008/0071908 A1 | 3/2008 | Nair et al. | 709/226 |
| 2008/0168135 A1* | 7/2008 | Redlich et al. | 709/204 |
| 2008/0172745 A1* | 7/2008 | Reinart et al. | 726/26 |
| 2008/0247674 A1* | 10/2008 | Walch | 382/305 |
| 2008/0270991 A1* | 10/2008 | Zeidman | 717/126 |
| 2009/0100518 A1* | 4/2009 | Overcash | 726/22 |
| 2009/0254572 A1* | 10/2009 | Redlich et al. | 707/10 |
| 2009/0287734 A1* | 11/2009 | Borders | 707/102 |
| 2009/0313271 A1* | 12/2009 | Zeidman | 707/100 |
| 2010/0058474 A1* | 3/2010 | Hicks | 726/24 |
| 2010/0106705 A1* | 4/2010 | Rush et al. | 707/709 |
| 2010/0153840 A1* | 6/2010 | Abhyankar et al. | 715/243 |
| 2010/0198799 A1* | 8/2010 | Krishnan et al. | 707/702 |
| 2011/0167474 A1* | 7/2011 | Sinha et al. | 726/1 |
| 2012/0042361 A1* | 2/2012 | Wong et al. | 726/4 |
| 2012/0079603 A1* | 3/2012 | Brown et al. | 726/26 |

FOREIGN PATENT DOCUMENTS

| | | |
|---|---|---|
| EP | 1 734 719 B1 | 12/2009 |
| KR | 10-0746944 | 8/2007 |
| WO | WO 98/25372 | 6/1998 |
| WO | WO 00/28473 | 5/2000 |
| WO | WO 01/46839 A1 | 6/2001 |
| WO | WO 03/042799 A2 | 5/2003 |
| WO | WO 2007/109726 A2 | 9/2007 |
| WO | WO 2007/143314 A9 | 12/2007 |

OTHER PUBLICATIONS

Saul Schleimer et al., Winnowing: Local Algorithms for Document Fingerprinting, SIGMOD (Jun. 9-12, 2003).*

* cited by examiner

```
public class GeneralUtil { protected static final SimpleDateFormat format = new SimpleDateFormat("yyyy-MM-dd hh:mm:ss");

/**
     * Creates a new instance of GeneralUtil.
     */
    public GeneralUtil() {
    }

/** Gets today's date. */
    public static Date getCurrentDate() {
        Date date = new Date();
        try {
            Calendar cal = Calendar.getInstance();
            date = cal.getTime();
        }
        catch (Exception e) {
            System.err.println("insight.common.util.GeneralUtil: " + e);
            e.printStackTrace();
        }
        return date;
    }
}
```

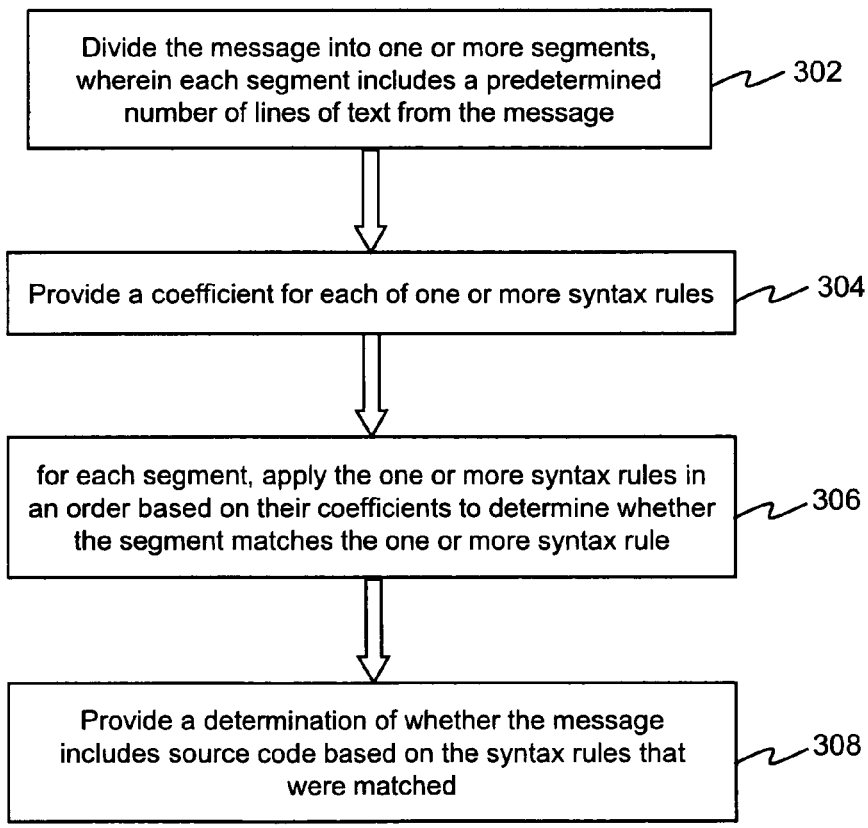

Fig. 3

```
package insight.common.util;

import java.text.SimpleDateFormat;

public class GeneralUtil {
....
    protected static final SimpleDateFormat format = new SimpleDateFormat("yyyy-MM-dd hh:mm:ss");

public static Date interestingMethodAction() {
        //this is my comment for the interestingMethodAction
    }
....
    //Gets today's date
    public static Date getCurrentDate() {
        Date date = new Date();
        try {
            Calendar cal = Calendar.getInstance();
            date = cal.getTime();
        }
        catch (Exception e) {
            System.err.println("insight.common.util.GeneralUtil: " + e);
            e.printStackTrace();
        }
        return date;
    }
....etc
```

Fig. 10

METHOD AND SYSTEM FOR SECURING AGAINST LEAKAGE OF SOURCE CODE

TECHNICAL FIELD

Embodiments of the invention relate generally to a method and a system for securing against leakage of source code.

BACKGROUND

Information Leakage Detection and Prevention ("ILDP") is an emerging and fast-growing area in the field of information security. The business drivers to prevent information leakage have existed. However, due to the limitation of technological options in the past, organizations have been relying on measures with limited effectiveness. With information going digital and the growing prevalence of Internet access, the risk of sensitive corporate information/intellectual assets being leaked out poses a problem.

One common shortcoming of existing ILDP solutions is that they aim to protect every single valuable information, which leads to lengthy and laborious attempts to try to understand how every employee uses potentially sensitive information. Some ILDP solutions, especially those with client-side agents, require complex and time-consuming installation and configuration. Other conventional solutions require users to copy sensitive information to centralized locations, resulting in interruption to business users.

In addition, organizations generally do not know the data context and hence are not able to create the relevant rules. The general approach of the other ILDP solutions makes this problem worse by requiring the organizations to understand the data context fully.

Most ILDP solutions do not possess context awareness and implement policies in a one-sided manner—by looking at the sender or source—without identifying who the recipients are. This further exacerbates the perception that ILDP obstructs, more than provide benefits to, business.

In addition, there is no existing ILDP solution that is able to detect information that is already leaked out to the Internet sites. With the increased popularity of Web 2.0 applications, the speed of spreading of information has increased, which makes timely discovery of public domain leakages more important.

Another shortcoming of the existing ILDP solutions is that there is no segregation of access to collected information from an administrator. This means all sensitive information that is captured by the ILDP system will be made available to the administrators.

Therefore, there is a need to provide a new method and system which overcome at least one of the above-mentioned problems.

SUMMARY

In an embodiment, there is provided a method of detecting source code in a message being sent over a digital communication network to secure against unauthorized leakage of source code. The method includes intercepting the message on a network device, placing the message into a memory on the network device, and dividing the message in the memory into one or more segments, wherein each segment includes a predetermined number of lines of text from the message. For each segment, one or more syntax rules of a programming language is applied to the segment and a predetermined number of context lines of text before the segment and/or after the segment, to determine which of the syntax rules of the programming language are matched in the segment. A determination of whether the text message includes source code is provided based on the syntax rules that were matched.

In another embodiment, a system for securing against leakage of source code is provided. The system includes a network device connected to a network, wherein the network device is configured to intercept a message on the network and store the intercepted message in a memory on the network device. The network device is further configured to detect source code in the message by dividing the text message in the memory into one or more segments, wherein each segment includes a predetermined number of lines of text. For each segment, the network device is configured to apply one or more syntax rules of a programming language to the segment together with a predetermined number of context lines of text before the segment and/or after the segment to determine which of the syntax rules of the programming language are matched in the segment, and provide a determination of whether the text message includes source code based on the syntax rules that were matched. The network device is further configured to take an action to secure against unauthorized leakage of source code if it is determined that the message includes source code.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the various embodiments. In the following description, various embodiments are described with reference to the following drawings, in which:

FIG. 2C shows a text segment and its context lines of text in accordance with an embodiment of the invention.

FIG. 3 shows a flowchart of determining whether a message includes source code according to an embodiment.

FIG. 10 shows an exemplary piece of source code for illustrating the detailed process of obtaining unique identifying elements.

DETAILED DESCRIPTION

Various embodiments of the invention provide a method and a system for securing against leakage of source code by detecting source code in a message being sent over a digital communication network.

Figure 1:
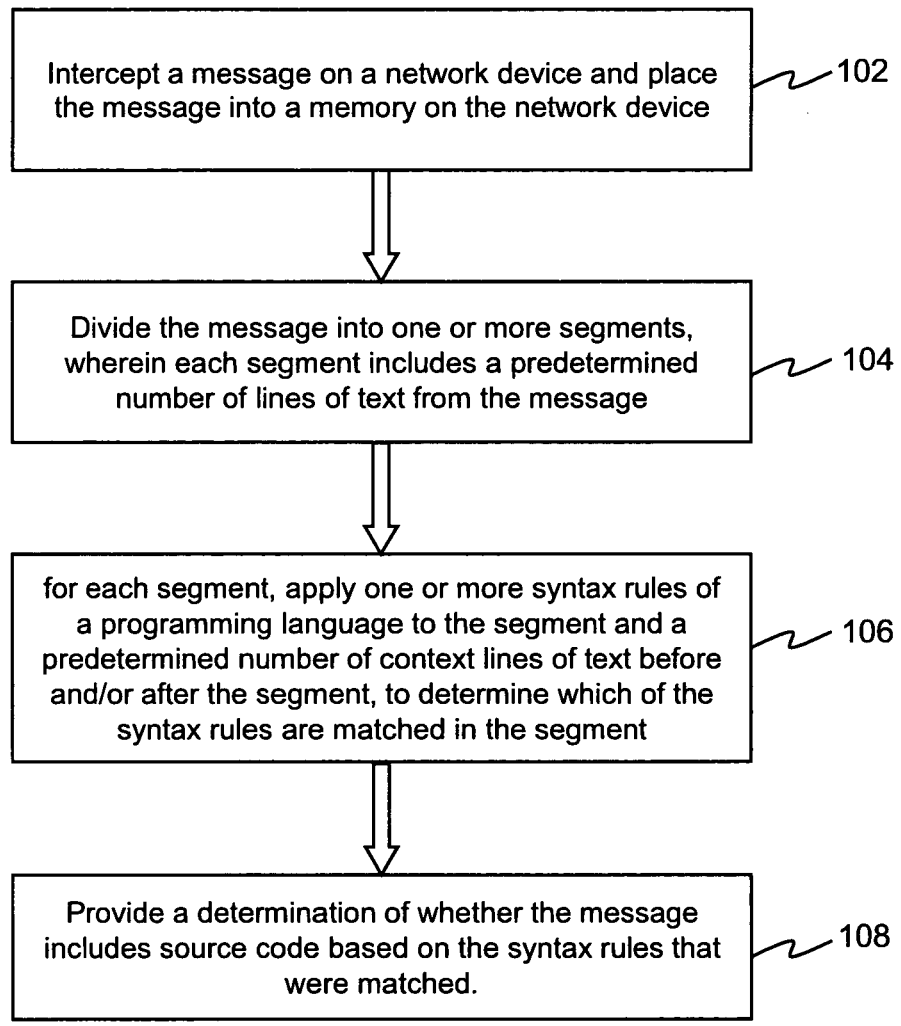
FIG. 1 shows a flowchart of determining whether a message being sent over a digital communication network includes source code according to an embodiment.

FIG. 1 shows a flowchart of a process for determining whether a message being sent over a digital communication network includes source code according to an embodiment.

At 102, the message is intercepted on a network device and is placed into a memory on the network device.

At 104, the message in the memory is divided into one or more segments, wherein each segment includes a predetermined number of lines of text from the message.

At 106, for each segment, one or more syntax rules of a programming language is applied to the segment and a predetermined number of context lines of text before the segment and/or after the segment, to determine which of the syntax rules of the programming language are matched in the segment.

At 108, a determination of whether the text message includes source code is provided based on the syntax rules that were matched.

According to one embodiment of the invention, the message is intercepted on the network device before being sent out to another device on the digital communication network, and the message is analysed to determine whether there is source code included therein. The source code may be sensitive or secure information which needs to be protected. By having the information of the existence of source code, it may be determined whether the message containing the source code should be sent out, so that unauthorized leakage of source code can be secured against.

In this context, the message may be in the form of plain text or binary documents, such as a MICROSOFT® VISUAL STUDIO® integrated development environment project file or MICROSOFT® WORD® word processor document, which may contain source code. The message may be an encoded or encrypted message. Accordingly, the message may be decoded first before performing the determination of whether the message includes source code.

In an embodiment, the message may be divided into one or more segments, each segment including a predetermined number of lines. A sliding window offset may be used to cause the starting line of each segment to be varied during multiple passes over the text to determine whether source code is present. FIG. 2B, below, illustrates dividing the source code into segments.

Figure 2A:
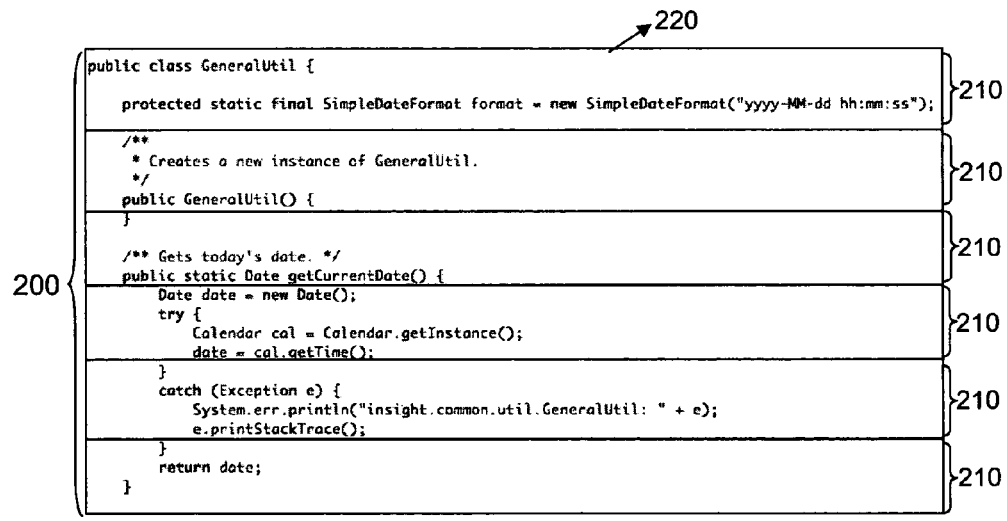
FIG. 2A shows a message including text to be determined whether there is source code included therein.
Figure 2B:
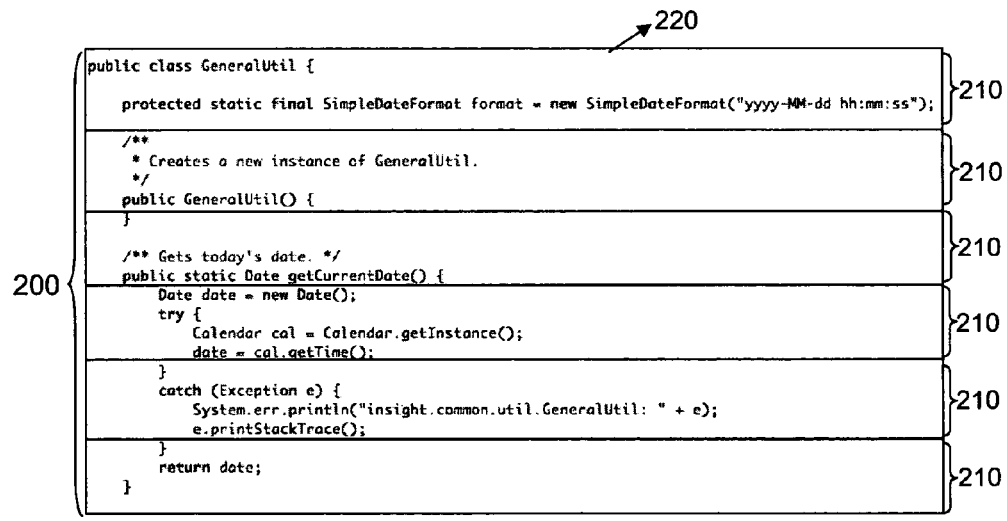
FIG. 2B shows a plurality of text segments in a message according to an embodiment of the invention.

FIG. 2A shows a message 200 including text to be determined whether there is source code included therein.

FIG. 2B shows a plurality of text segments in a message according to an embodiment of the invention.

Each segment 210 includes a predetermined number of lines of text from the message 200. The predetermined number of lines may be represented by a configurable parameter "segment_size". In this example, the segment_size is set to be 4.

The plurality of text segments 210 is determined by using a sliding window 220 to slide the message 200 into the plurality of text segments 210. In this example, as the segment_size is set to be 4, the size of the sliding window 220 may be 4 lines of text, such that each text segment 210 includes 4 lines of text from the message 200.

According to an embodiment, when applying one or more syntax rules of the programming language to a segment, the context of the segment may be taken into account, by examining lines of text before and after the segment.

FIG. 2C shows a text segment and its context lines of text in accordance with an embodiment of the invention.

In this example, the 4th segment 230 of FIG. 2B is illustrated, which includes 4 lines of text. The context of the segment 230 is referred as the lines of text before the segment 230 and/or after the segment 230 in the message 200. The context of the segment 230 may include a predetermined number of context lines of text. The predetermined number of context lines may be represented by a configurable parameter "context_size". In this example, the context_size is set to be 2. According, the context lines of text 240 before and after the segment 230 are highlighted in FIG. 2C.

In an embodiment, when applying one or more syntax rules of the programming language to each segment, the one or more syntax rules are applied to the selected segment 230 together with its context lines of text 240, which may help to increase the accuracy of the determination of the existence of source code.

According to an embodiment, if source code is determined to be included in a text segment and its context lines, contents of the text segment may be stored in a memory together with the previous text segments which are determined to include source code. The total size of source code detected in the original message may be determined based on the total size of the detected source code in the respective text segments.

In one embodiment, the application of the one or more syntax rules is repeated for each segment. The syntax rules are the rules corresponding to the programming language, which may be a programming language pre-selected by an administrator, e.g. the administrator of the network device. The pre-selected programming language may be a preferred language of the administrator, which may be of higher security level. By pre-selecting a preferred programming language, the corresponding syntax rules may be applied to the message first, thereby accelerating the determination of source code in the pre-selected programming language.

In another embodiment, the application of the one or more syntax rules is repeated on each segment for syntax rules of a plurality of programming languages. In other words, source code in a plurality of programming languages may be detected. In one example, an order in which the plurality of programming languages will have their one or more syntax rules applied to each segment is determined by an administrator. In another example, an order in which the plurality of programming languages will have their one or more syntax rules applied to each segment is determined according to a market survey of the popularity of programming languages. In a further example, one or more preferred programming languages selected by an administrator are ordered first, and the un-selected programming languages may be ordered according to the popularity of these programming languages.

FIG. 3 shows a flowchart of determining whether a message includes source code according to an embodiment.

At 302, the message is divided into one or more segments, wherein each segment includes a predetermined number of lines of text from the message.

At 304, a coefficient for each of one or more syntax rules is provided.

At 306, for each segment, the one or more syntax rules is applied in an order based on their coefficients to determine whether the segment matches the one or more syntax rule.

At 308, a determination of whether the message includes source code is provided based on the syntax rules that were matched.

Figure 4:
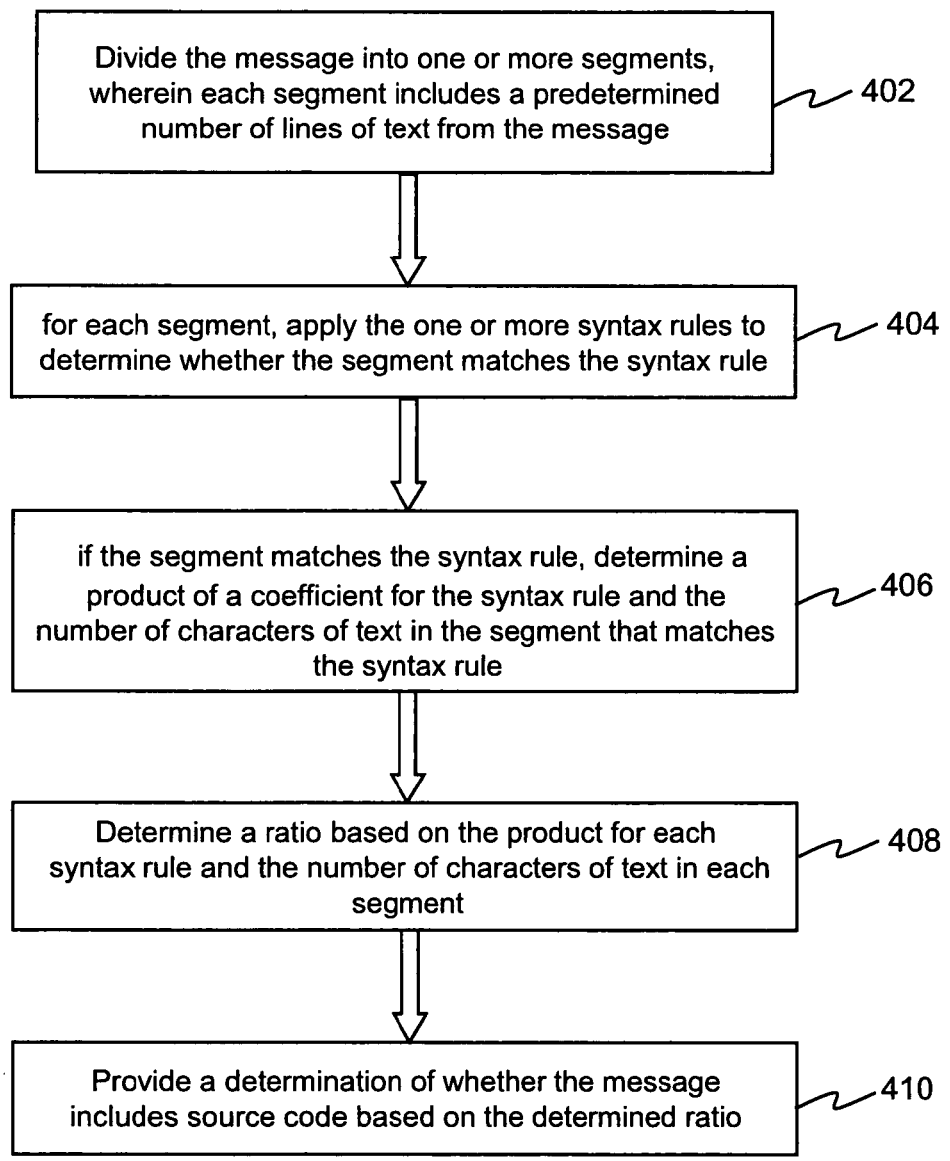
FIG. 4 shows a flowchart of determining whether a message includes source code according to another embodiment.

FIG. 4 shows a flowchart of determining whether a message includes source code according to another embodiment.

At 402, the message is divided into one or more segments, wherein each segment includes a predetermined number of lines of text from the message.

At 404, for each segment, one or more syntax rules is applied to determine whether the segment matches the syntax rule.

At 406, if the segment matches the syntax rule, a product of a coefficient for the syntax rule and the number of characters of text in the segment that matches that syntax rule is determined.

At 408, a ratio based on the product for each syntax rule and the number of characters of text in each segment is determined.

At 410, a determination of whether the message includes source code is provided based on the determined ratio.

The embodiments as described in FIGS. 3 and 4 will be explained in detail below.

In an embodiment, the ratio is also referred to as the probability value P representing the probability of a segment containing source code. P is a ratio value between 0 and 1. The probability of the inspected segment containing source code increases as P approaches 1, and reduces as P approaches 0.

A contributing factor to the ratio value P is the extent to which the inspected text segment matches one or more syntax rules of a particular programming language. In accordance with an embodiment, a coefficient is provided to each of the one or more syntax rules for one or more programming languages wherein the coefficient indicates the weight of the matched syntax rule in determining the ratio value P. In an example, the coefficient is a whole number greater than 0.

In one embodiment, the coefficient for a syntax rule is provided based at least in part on the uniqueness of that syntax rule in its programming language. For example, the more unique the syntax rule is to the particular programming language, the higher is the coefficient value. In another embodiment, the coefficient for a syntax rule may be provided based on other factors, such as the importance of the syntax rule in its programming language, etc. This may help to increase the speed and accuracy of detecting source code in a particular programming language.

The one or more syntax rules may be applied to each segment in an order based on their coefficients. In an embodiment, the one or more syntax rules are applied to each segment in an order from highest coefficient to lowest coefficient. The highest coefficient may represent the high importance or uniqueness of the corresponding syntax rule, so that that syntax rule is applied first. The one or more syntax rules may be applied to each segment in other orders which may be defined by an administrator as well, in accordance with other embodiments.

For each programming language, a program thread may be created to inspect all the segments based on the relevant syntax rules. According to an embodiment, within the thread, the inspected message may be checked against the syntax rules of the particular programming language in a descending order of coefficient values of the syntax rules. Accordingly, syntax rules which provide the highest confidence level that the inspected message contains source codes of the particular programming language is applied and checked first.

When a syntax rule is matched with a segment, a product of the coefficient for this syntax rule and the number of characters of text in the segment that match this syntax rule is determined. This product may also be referred to as a weighted size of the matched characters in the segment, denoted by "weighted_size" and may be determined by the following formula:

weighted_size=weighted_text_length*coefficient wherein weighted_text_length is the number of characters that matched the syntax rule and coefficient is the corresponding coefficient value of the matched syntax rule.

In an embodiment, the ratio P, representing the probability of a segment containing source code as described above, may be determined based on the product for each syntax rule described above and the number of characters of text in each segment, as will be described in the following.

The matching of one or more syntax rules with each segment may be repeated. In an embodiment, when a syntax rule is matched with the segment, the product value for this that syntax rule is determined as described above. The next syntax rule of the one or more syntax rules may be then matched with the segment. The order of the syntax rules to be matched with the segment may be determined based on the coefficients of the syntax rules as described in the embodiments above.

Accordingly, for each matched syntax rule, a corresponding product value "weighted_size" is determined. The product values "weighted_size" for the matched syntax rules may be summed up to determine a cumulative weighted size of the matched characters in the segment. For example, the cumulative weighted size may be denoted as "cumulative_weighted_size" and may be determined by summing up all the "weighted_size" values of the current text segment. The "cumulative_weighted_size" represents a scaled value of the cumulative size of the matched characters in the segment, based on the coefficients of the matched syntax rules.

In an embodiment, the cumulative size of the matched characters in the segment may also be determined, which represents the cumulative number of the matched characters in the segment. The cumulative size of matched size of the matched characters may be denoted as "cumulative_weighted_text_length" and may be determined by summing up all the weighted_text_length values of the current text segment.

In an embodiment, the ratio P for each segment may be determined based on the product for each syntax rule and the number of characters of text in the segment using the following formula:

$$P = \frac{\text{cumulative\_weighted\_size}}{\text{total\_number\_of\_characters} + \text{cumulative\_weighted\_size} - \text{cumulative\_weighted\_text\_length}}$$

wherein cumulative_weighted_size represents the cumulative value of the product of each matched syntax;

cumulative_weighed_size represents the cumulative value of the number of matched characters of text of each syntax;

total_number_of_characters represents the total number of characters of text in the segment.

For example, in a text segment including 300 characters, 100 characters match with a first syntax rule having a coefficient 20, and 50 characters match with a second syntax rule having a coefficient 10. Then, cumulative_weighted_size=(100*20)+(50*10)

cumulative_weighted_text_length=100+50 total_number_of_characters=300,

According, the ratio value P is computed as follows:

$$P = \frac{(100*20) + (50*10)}{300 + ((100*20) + (50*10) - (100+50))}$$
$$= 0.943396226$$

Based on the ratio value P, it may be determined whether the segment and accordingly the message include source code or not. In an embodiment, the ratio value P may be compared with a predetermined threshold value T to determine the existence of source code. If the ratio value exceeds the threshold value, it may be determined that the source code for a particular programming language is present in the message, and the relevant action may be taken, such as sending an alert message to a device on the network.

According to an embodiment, the threshold value is configurable, and may be in the range of 0 and 1. In one example, the threshold value may be updated through regular system updates or manual modification. In another embodiment, the threshold value may be configured manually and may not be subjected to automatic updates. In an embodiment, there may be an independent threshold value for each programming language. For each programming language, the corresponding ratio value is compared with its threshold value to determine whether the message includes the source code in this programming language.

In the above embodiment, the ratio value may be determined after all the syntax rules of a programming language have been applied to the segment.

In another embodiment as described in FIG. 5 below, only some of the syntax rules are applied to the segment depending on the ratio value being determined.

Figure 5:
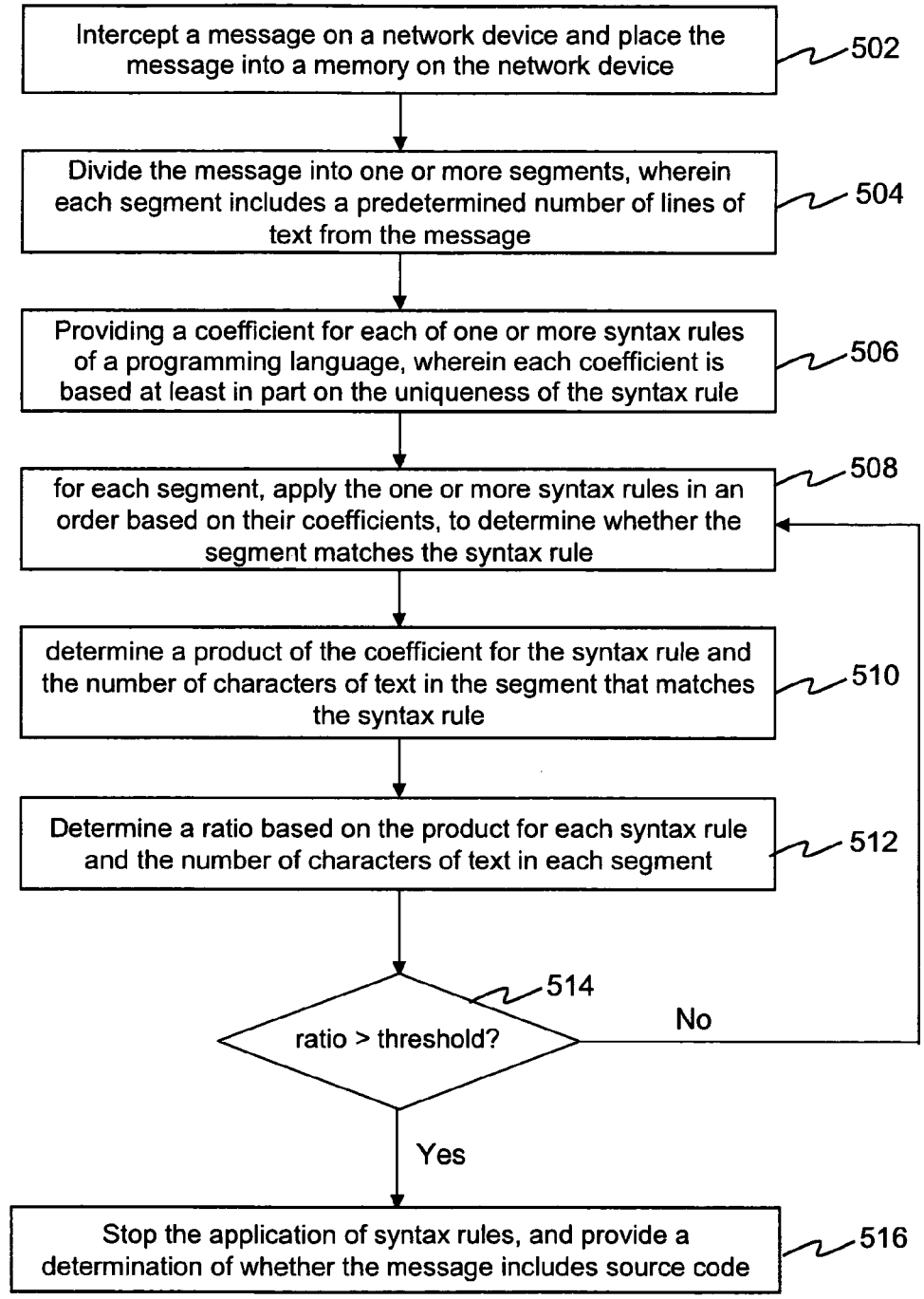
FIG. 5 shows a flowchart of determining whether a message includes source code according to another embodiment.

FIG. 5 shows a flowchart of determining whether a message includes source code according to another embodiment.

At 502, a message is intercepted on a network device and placed into a memory on the network device.

At 504, the message is divided into one or more segments, wherein each segment includes a predetermined number of lines of text from the message.

At 506, a coefficient is provided for each of one or more syntax rules of a programming language, wherein each coefficient is based at least in part on the uniqueness of the syntax rule.

At 508, for each segment, the one or more syntax rules is applied in an order based on their coefficients to determine whether the segment matches the syntax rule. In an embodiment, the order is from highest coefficient to lowest coefficient.

At 510, a product of the coefficient for the syntax rule and the number of characters of text in the segment that matches the syntax rule is determined.

At 512, a ratio based on the product for each syntax rule and the number of characters of text in each segment is determined.

At 514, it is determined whether the ratio exceeds a threshold value. If not, the next syntax rule of the syntax rules is continued to be applied to the segment as shown at 508.

If the ratio exceeds the threshold value, the application of syntax rules is stopped and a determination of whether the message includes source code is provided at 516.

In accordance with the above embodiment, a text segment will not be checked against all the syntax rules of a particular programming language. When the ratio value P exceeds the threshold value for the particular programming language, the inspection of current text segment is stopped. The next text segment of the message will be inspected.

The detected size of source code for each programming language may be computed by summing up the number of characters identified as belonging to the particular programming language from all collected text segments.

According to an embodiment if source codes in one or multiple programming languages are detected, a network correlation device may be informed which will apply all relevant correction rules to prevent leakage of source code as will be described in a later portion of the description.

Another embodiment of the invention relates to a system for securing against leakage of source code. The system may include a network device connected to a network, wherein the network device is configured to intercept a message on the network and store the intercepted message in a memory on the network device. The network device is further configured to detect source code in the message by dividing the text message in the memory into one or more segments, wherein each segment includes a predetermined number of lines of text. For each segment, the network device is configured to apply one or more syntax rules of a programming language to the segment together with a predetermined number of context lines of text before the segment and/or after the segment to determine which of the syntax rules of the programming language are matched in the segment, and provide a determination of whether the text message includes source code based on the syntax rules that were matched. The network device is further configured to take an action to secure against unauthorized leakage of source code if it is determined that the message includes source code.

The network device may be configured to detect source code in a message in accordance with all the embodiments of determining source code in a message as described above. The source code detection may be implemented by a source code detection unit in the network device, and the source code detection unit may be implemented by a processor to perform the method of determining whether a message includes source code as described above.

The network device in accordance with the embodiments of the invention may be referred to as a network gateway device, which includes a unit or module configured to detect sensitive information (e.g. the source code) in a digital communication (e.g. a message) sent over a digital network (e.g. from an internal network to an external network). The internal network may be a network controlled by an organization. The external network may be a network that is not controlled by the organization that controls the internal network, such as the Internet. The network device may also include other units or module for preventing leakage of sensitive information in a digital communication system as will be described in the following. Examples of the network gateway device include but are not limited to a hub, a router, a server, a proxy server, an email server, etc.

Figure 6A:
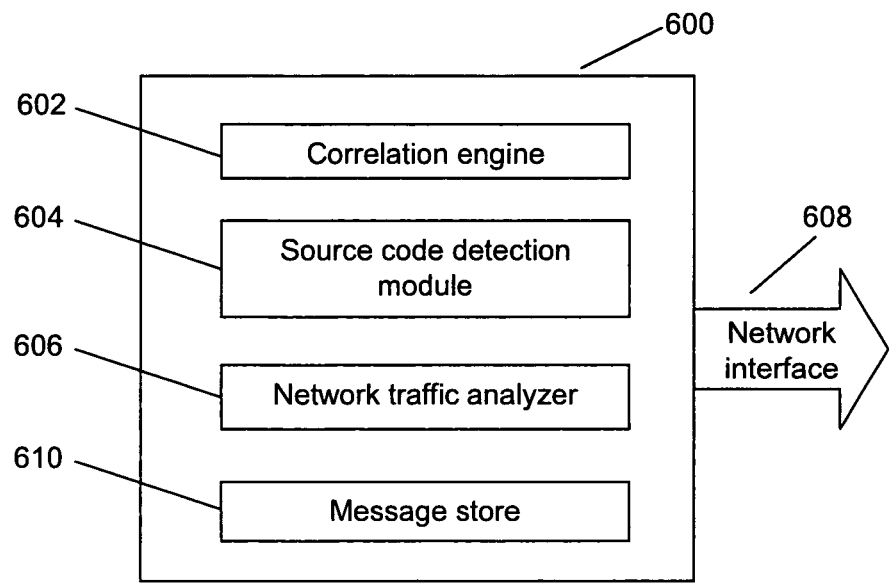
FIGS. 6A and 6B show a schematic diagram of an embodiment of the network gateway device.

FIG. 6A shows a schematic diagram of an embodiment of the network gateway device 600. The network gateway device 600 may include three units or modules, namely a correlation engine 602, a source code detection module 604 and a network traffic analyzer 606. The network gateway device 600 may further include a network connection 608 to the internal network and a message store 610 that stores the digital communication. In some embodiments, the network gateway device may also include a second network connection (not shown) to an external network, such as the Internet. In different embodiments, the network gateway device 600 may have different parts and the number of parts of the network gateway device 600 may also vary.

The network gateway device 600 may intercept the digital communication being sent from an internal network to an external network.

The source code detection module 604 is used for detecting source code in the digital communication as described in the embodiments above. The correlation engine 602 is used for evaluating a security risk of the digital communication based on context information associated with the digital communication, wherein the source code being detected by the source code detection module 604 may be used as one type of context information in the correlation engine 602. The network gateway device 600 may be configured to send an alert to at least one device connected to the internal network, depending on the determined security risk.

In accordance with the embodiments of the invention, the correlation engine 602 included in the network gateway device 600 is configured to prevent leakage of sensitive digital information implemented in a digital communication network. In an embodiment, the correlation engine 602 of the network gateway device 600 is configured to intercept a digital communication being sent from an internal network to an external network, extract one or more context information items from the digital communication, determine a security risk associated with the digital communication based on the one or more context information items, and send an alert based on the security risk to at least one device connected to the internal network. The correlation engine may be implemented as a processor, as dedicated hardware, or as a software module, executing along with other software modules on a processor in the network gateway device.

SSL (secure sockets layer)-encrypted network traffic may be intercepted and decrypted through the means of updating internal domain name system (DNS) records of external destinations and internally-generated SSL certificates may be provided by an internal certificate authority to user applications which have pre-trusted the internal certificate authority.

Figure 6B:
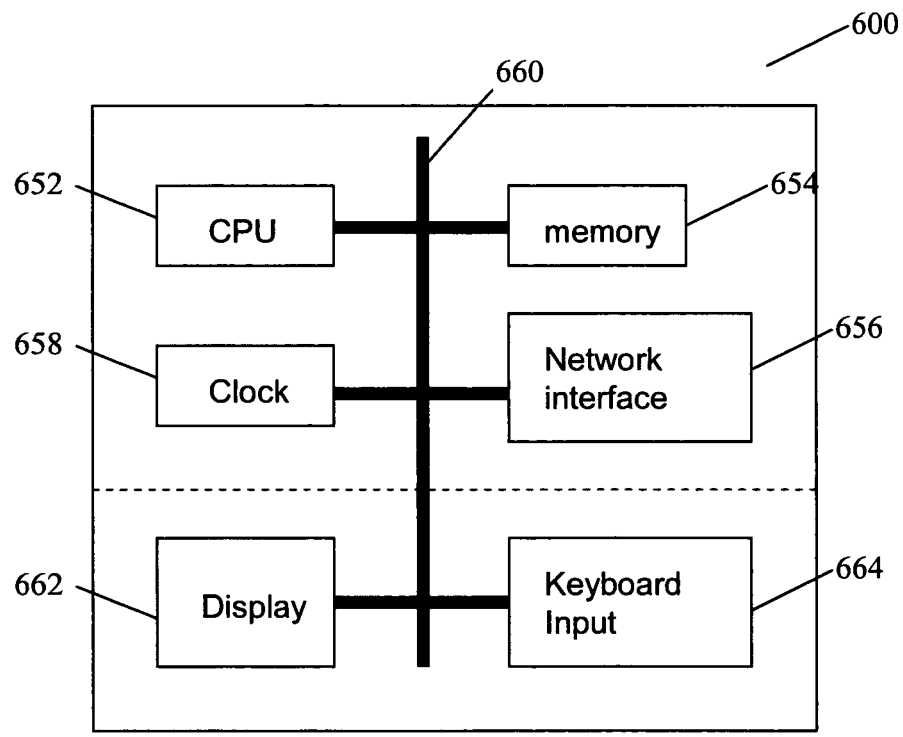

FIG. 6B shows a schematic diagram of an embodiment of the network gateway device 600.

The network gateway device 600 may be implemented by a computer system. In some embodiments, the correlation engine 602, the source code detection module 604 and the network traffic analyzer 606 of the network gateway device 600 may also be implemented as modules executing on a computer system. The computer system includes a CPU 652 (central processing unit), a memory 654, a network interface 656, a clock 658, and input/output devices such as a display 662 and a keyboard input 664. All the components of the computer system 652, 654, 656, 658, 662, 664 are connected and communicating with each other through a computer bus 660.

The memory 654 may be used as the message store for storing the digital communication as explained above. The memory 654 may include more than one memory, such as RAM, ROM, EPROM, hard disk, etc. wherein some of the memories are used for storing data and programs and other memories are used as working memories.

The memory 654 may be configured to store the instructions for securing against leakage of source code. The instructions, when executed by the CPU 652, may cause the processor 652 to intercept a message on the network, store the intercepted message in the memory 654 on the network device 600, detect source code in the message by dividing the text message in the memory 654 into one or more segments, wherein each segment includes a predetermined number of lines of text. For each segment, the instructions may cause the processor 652 to apply one or more syntax rules of a programming language to the segment together with a predetermined number of context lines of text before the segment and/or after the segment to determine which of the syntax rules of the programming language are matched in the segment, and to provide a determination of whether the text message includes source code based on the syntax rules that were matched. The instructions may cause the processor 652 to take an action to secure against unauthorized leakage of source code if it is determined that the message includes source code.

In another embodiment, the memory 654 may be configured to store other instructions for preventing leakage of sensitive digital information implemented in a digital communication network. The instructions, when executed by the CPU 652, may cause the processor 652 to intercept a digital communication being sent from an internal network to an external network, extract one or more context information items from the digital communication, determine a security risk associated with the digital communication based on the one or more context information items, and send an alert based on the security risk to at least one device connected to the internal network.

The CPU 652 may be used as the network gateway device 600 as described in FIG. 6A above, and may be connected to an internal network (e.g. a local area network (LAN) or a wide area network (WAN) within an organization) and/or an external network (e.g. the Internet) through the network interface 656.

Figure 7:
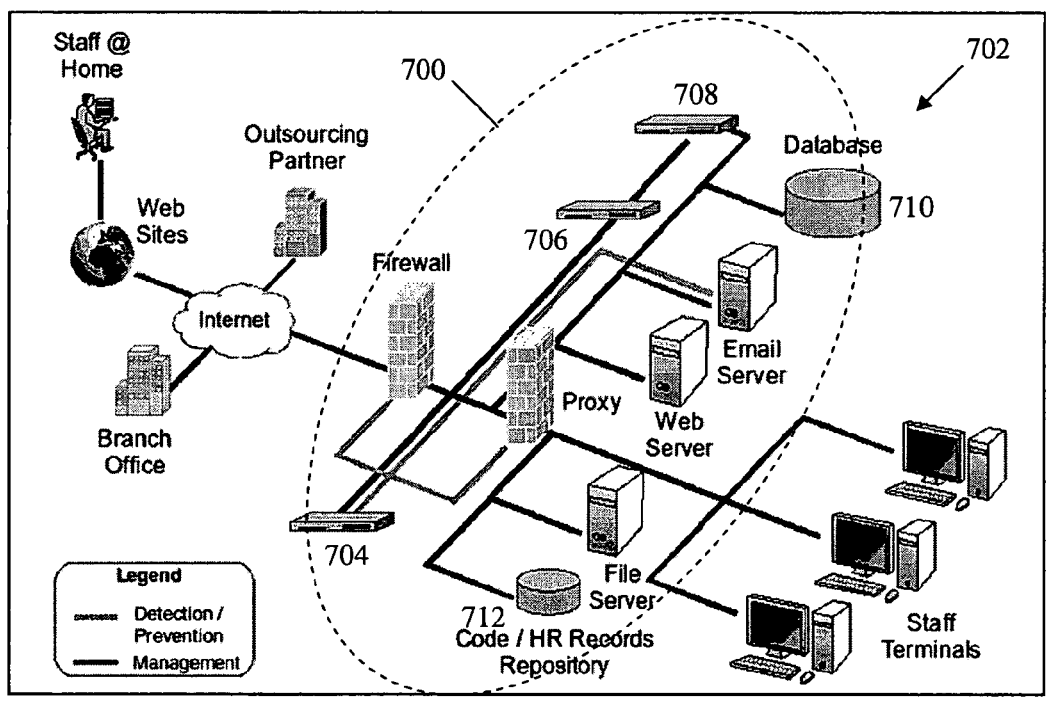
FIG. 7 shows a schematic diagram of a system for preventing leakage of sensitive digital information implemented in a digital communication network.

FIG. 7 shows a schematic diagram of a system 700 for preventing leakage of sensitive digital information implemented in a digital communication network 702. The system 700 may have three components, namely a network gateway device 704, a management device 706 and a crawler server 708. In some embodiments, the network gateway device 704, the management device 706 and crawler server 708 may be implemented as a computer system similar to the computer system 600 in FIG. 6B above. In another embodiment, the system 700 may also include a database 710 used as an identity-relationship database and a source code repository 712 storing one or more source code modules. In different embodiments, the system 700 may comprise different components and the number of components for the system 700 may also vary.

The network gateway device 704 is the network gateway device 600 in FIG. 6 above, and may be configured to analyze the digital information transmitted over the network and apply relevant policies to a digital communication for preventing leakage of sensitive information. As the network gateway device 704 is used to protect against leakage of sensitive information, the network gateway device 704 may be considered as a protecting device, which may be named as "iProtect" device. The network gateway device 704 may intercept the digital communication being sent from an internal network to an external network. The network gateway device 704 may include a correlation engine for evaluating a security risk of the digital communication, a source code detection module for detecting source code in the digital communication, and a network traffic analyzer for analyzing the digital communication and determine the network identity of the user.

The correlation engine, the source code detection module and the network traffic analyzer may be implemented as one or more processors, as dedicated hardware, or as a software module, executing along with other software modules the one or more processors in the network gateway device 704. The network gateway device 704 may be configured to send an alert to at least one device connected to the internal network, depending on the determined security risk. In different embodiments, the network gateway device 704 may have different parts and the number of parts of the network gateway device 704 may also vary.

The management device 706 of the system 700 may be a management and administration tool that can be used to control the network gateway device 704 and the crawler server 708, and to provide management reports. The system 700 may comprise a plurality of the management devices 706 to provide scalability. The crawler server 708 of the system 700 may be configured to search Internet sites for leakages of information. The system 700 may provide the ability to control the digital communication of protected information, hence providing comprehensive protection to digital information assets.

Some features of the system 700 include but are not limited to instant protection of structured content such as source codes and personnel records, context-aware monitoring capabilities, detection of public leakages, and segregation of evidence access from administrators. Details of the above features of the system 700 are described below.

Instant Protection of Source Codes and Personnel Records

The system 700 may provide instant protection against leakages of source codes and personnel records. The network gateway device 704 may include a source code detection module as described above which has recognition algorithms for all popular programming languages. The built-in recognition algorithms can also detect obfuscated source codes and protect them from being leaked. Location-specific recognition algorithms may also be built in for similar protection of personnel records, as personnel records differ between different geographical locations. For example, an individual's identification record or number in Singapore is different from that in the United States.

Context-Aware Monitoring Capabilities

The system 700 may include context-aware monitoring capabilities in the form of a correlation engine (such as the correlation engine 602 as described above). Unlike other conventional technologies, the system 700 may perform a contextual correlation of the digital information within an organization's network or the digital information found in the public domain. The context-aware correlation engine may provide a more fine-grained control for the organization and may aim to protect, instead of obstructing, the business more effectively.

Detection of Public Leakages

The system 700 may include a crawler server 708, which may allow the system 700 to search, detect and monitor for leakage of valuable source codes or personnel records to popular Internet sites. The crawler server 708 may allow the organization to be informed of any public leakages, including those from outside the organization's network.

Segregation of Evidence Access from Administrators

The system 700 may make use of an asymmetrical key method to prevent the administrators from accessing the collected evidence. The private key may be held by the business owners, who can be assured of the confidentiality of the evidence collected by the system. Administrators of the system may not be allowed to view the captured source codes that can be blocked from being leaked from the development team.

Details of the functions of the network gateway device 704, the management device 706 and the crawler server 708 of the system 700 are described in the following.

Management Device

The management device 706 may provide the centralized reporting and policy management for the system 700. The management device 706 may include a management dashboard, a message bus, and an administration console. The management device 706 may have a policy distribution module for disseminating rules. Trust between each component of the management device 706 may be established using digital certificates.

Management Dashboard

The management dashboard may be provided for management reporting to business users and easy access to reports on the system 700. The management dashboard may also support exporting of data via comma separated value (CSV) files to allow users to further customize their reports to their needs. The management dashboard may be web-based.

A replay function may be provided in the management dashboard to allow users to replay the leakage incidents that are captured. Only authorized business users can have full access to the replay function, which may require their private keys to view the full replay and content. For authorized users without the private key, only summary information may be displayed.

Message Bus

A message bus, which may be of enterprise-grade, can be used to collect information from the network gateway device 704 and the crawler server 708. Certificate-based mutual authentication may be used to prevent spoofing of any components in the system 700. The message bus may provide reliable and scalable transmission of information.

Administration Console

Besides the management dashboard, there may also be an administration console. The administration console may be web-based. The administration console may allow daily administration and operation of the system 700. The administration console may allow administrators to perform a plurality of administrative tasks. The administrative tasks may include but may not be limited to registering new components for certificate-based mutual authentication, configuring backup storage for archive, creating correlation rules, configuring alerts, configuring user sensitivity module, configuring user accounts for access to the administration console and the management dashboard, deploying patches to other components in the system 700, and configuring integration with existing Security Incident and Event Management products.

Another administrative task may be generating a pair of public and private keys for encrypting/decrypting sensitive contents, e.g. email content, file attachments, IM conversations and etc. The generated private key may be stored on a separate medium under the custody of business owners. The private keys may be held temporarily in a volatile memory. The public keys may be stored in the system 700. The evidence collected may be encrypted with the public keys of the business owners who are authorized to review the evidence. To perform a full review of evidence, the private key may be required to be supplied by the business owners for decrypting the evidence for display. Administrators of the system may not be able to view the content of collected evidence as they do not have access to the private key.

Network Gateway Device

The network gateway device 704 of the system 700 is used for detecting sensitive information and preventing leakage of sensitive information in accordance with the embodiments described above. It can be operated in a plurality of modes. In one embodiment, the network gateway device 704 is operated in two modes, namely monitoring mode and active protection mode. In the monitoring mode, a sniffer sub-component of the network gateway device 704 may be activated and can capture digital communication from within a network hub, a network tap or a span port of a core switch to capture the digital communication.

In the active protection mode, the sniffer sub-component may be deactivated. ICAP (Internet Content Adaptation Protocol) and MTA (Mail Transfer Agent) server components may be activated to receive the digital communication from proxies and email servers. These components may support integration with existing enterprise proxies and email servers.

Detector components for instant messaging, web-based instant messaging, voice/video-over-IP, P2P and other proprietary traffic sent over the Internet, for email, web-based email and other non-HTTP traffic sent over HTTP/HTTPS, and for other HTTP/HTTPS traffic, may be activated in both monitoring and active protection modes to detect protected content in the digital communication network and to provide analysis against contextual correlation rules as configured in the management device 706. The protected structured content may be detected automatically using a detection component including heuristic recognition patterns. The protected structured content may also been automatically detected even if the content is obfuscated, scrambled or compressed.

Correlation Engine

The network gateway device 704 may include a processor for evaluating the security risk of the digital communication based on context information items associated with the digital communication. For illustration purposes, the processor may be taken to be implemented in the form of the correlation engine 602 described above. The digital communication may be stored in a message store 610 of the network gateway device 704 and at least a subset of the one or more context information items may be stored in a historical data store (not shown).

The context information items may include but may not be limited to time at which the digital communication is sent; a size of information in the digital communication; a type of information contained in the digital communication; a source of the digital communication (e.g. source IP, hostname and etc); an identity of a sender of the digital communication; a sensitivity of the sender of the digital communication; an intended destination for the digital communication (e.g. destination IP, hostname and etc); an identity of an intended recipient of the digital communication; whether the digital communication is encrypted (e.g. decipherability of information sent); and whether the digital communication contains digital rights-protected content. In different embodiments, the number of context information items may be different.

The correlation engine 602 may be designed to support a plurality of specific types of communication analysis (e.g. two types, namely Type 1 and Type 2) to determine the security risk associated with the digital communication. The correlation engine 602 may support different numbers of specific types of communication analysis in other embodiments.

The first kind of correlation analysis (Type 1) may be based on a set of predetermined rules to identify communication links that breach one or more predetermined rules. The identified communication link may be managed as a security breach incident. This correlation analysis may be applied to real-time traffic inspection.

The second kind of correlation analysis (Type 2) may be based on a probabilistic formula and risk rules to identify non-incident communication links that have high level risk of information leakage. This correlation analysis may be used on demand.

Type 1 Correlation Rule Construction and Correlation Analysis

Figure 8:
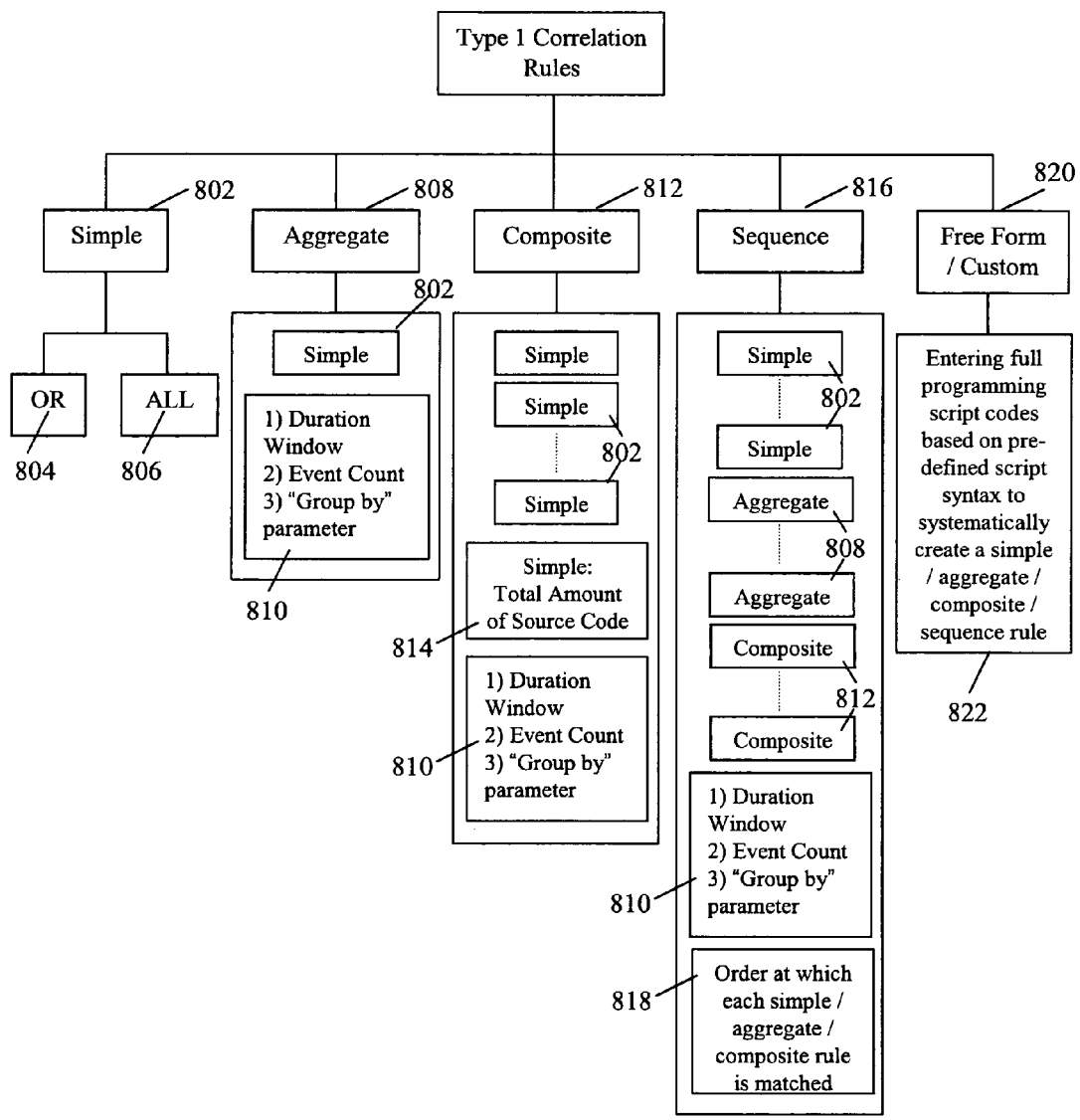
FIG. 8 shows a plurality of correlation rules used by the network gateway device for determining security risks according to an embodiment of the invention.

In Type 1 correlation rule construction, an administrator may be able to construct a plurality of types of predetermined rules (e.g. five types) using the management device 706. The predetermined rules may then be sent to the network gateway device 704 for determining security risks. The five types of predetermined rules are described in the following and are illustrated in FIG. 8.

A simple rule 802 may be made up of one or more conditions. Users can use an "OR" relationship 804 to indicate that the simple rule 802 may be matched when any one of the conditions is met by the context information items or an "ALL" relationship 806 to indicate that the simple rule 802 may be matched when all ("ALL") the conditions are met by the context information items. For each condition within a simple rule 802, users can define the criteria that the condition should match.

For example, users can make use of multiple conditions to specify that an alert is to be sent for any traffic sent on weekday AND later than 18:00 OR any traffic sent on weekend or holidays.

An aggregate rule 808 may be made up of a single simple rule 802. An aggregate rule may be further defined by a group 810 including a duration window, event count and a "group by" parameter. For example, users can define a duration window of 24 hours, event count of 3 and grouped by the same source user in an aggregate rule 808 using the simple rule 802 described above. With this configuration, alerts may be sent only when the specified simple rule 802 is matched 3 times in a day for the same sender, instead of every occurrence of the simple rule 802.

A composite rule 812 may be made up of multiple simple rules 802. The multiple simple rules 802 may belong to an "ALL" relationship such that all simple rules 802 within a composite rule 812 are matched to trigger the composite rule 812. A composite rule 812 may be further defined by a group 810 including a duration window, event count and a "group by" parameter, similar to those found in an aggregate rule 812. For example, users can also define a composite rule 812 including a simple rule 814 which checks the total amount of source codes detected exceeds 200 KB, together with one or more other simple rules 802. The duration window is 24 hours, event count is 3 and grouped by same department. The composite rule 812 may be triggered when 3 digital communication, each containing more than 200 kb of source codes are sent by any members of the same department after office hours in a day. With this configuration, alerts may be sent only when there are 3 occurrences of a single digital communication that matches both the specified simple rules 802 and 814 in a day within the same department, instead of every occurrence of the simple rule 802 or 814.

A sequence rule 816 may be made up of multiple simple/aggregate/composite rules (802, 808, 812) and has a group 810 including a duration window, event count and a "group by" parameter. It may include an additional criterion 818 which defines the order at which each of the simple/aggregate/composite rule (802, 808, 812) is matched. The sequence rule 816 may only be triggered when the order of all simple/aggregate/composite rules (802, 808, 812) is matched A free form/custom rule 820 may be defined by a process 822 of entering the full programming script codes based on our pre-defined script syntax to systematically create a simple/aggregate/composite/sequence rule (802, 808, 812, 816). This option may allow greater flexibility and usage of certain pre-defined functions not available from the other rules including but not limited to "UNION", "INTERSECTION" and "GATE".

In Type 1 correlation analysis, each communication link may be analyzed independently against all active simple rules 802. Multiple incidents may also be analyzed collectively to determine if there is a pattern match against one or more aggregate/composite/sequence rules (808, 812, 816). In different embodiments, different number of types of predetermined rules may be constructed for Type 1 correlation analysis.

Type 2 Correlation Analysis

In Type 2 correlation analysis, the correlation engine 602 may depend on a pre-defined probabilistic formula and a set of a plurality of context information items (e.g. ten context information items) to identify high security risk communication links between an internal identity and his/her contacts. A high security risk communication link may be defined as a communication link that did not trigger any incident rule, but may be likely to contain sensitive information leakage based on context and degree of variation from the sender's historical patterns during a specific time period. The security risk may be determined by the correlation engine 602 based on at least in part on the data from previous communications. The data from previous communications may be stored in a historical data store. The security risk may be determined by the correlation engine 602 based on past recorded context information associated with the sender of the digital communication.

In this embodiment, the ten context information items may be time at which the digital communication is sent; a size of information in the digital communication; a type of information contained in the digital communication (e.g. source code as may be determined by the source code detection module 604); a source of the digital communication (e.g. source IP, hostname and etc); an identity of a sender of the digital communication; a sensitivity of the sender of the digital communication; an intended destination for the digital communication (e.g. destination IP, hostname and etc); an identity of an intended recipient of the digital communication; whether the digital communication is encrypted (e.g. decipherability of information sent); and whether the digital communication contains digital rights-protected content.

In different embodiments, the number of context information items may be different. The context information items used for Type 2 correlation analysis may be different in other embodiments.

To determine the sensitivity of the sender of the digital communication, the correlation engine 602 may depend on a list of user-defined inputs entered by the management device 706. The user-defined inputs may include but are not limited to the involvement of the sender in sensitive projects within the organization; a last day of work for the sender; and preference of a supervisor of the sender.

To determine a type of information contained in the digital communication, the source code detection module 604 of the network gateway device 704 may determine whether the digital communication contains source code.

Since the security risk of the digital communication may be determined based on past recorded context information, a time period may be used to define the set of past recorded context information to be used for computing the degree of variation of the inspected digital communication against the set of past recorded context information belonging to each user.

From the set of past recorded context information as defined by the time period, the correlation engine 602 may obtain a plurality of mode values (e.g. top ten mode values) for each context information item. In different embodiments, the number of mode values for each context information item may be different. A plurality of mode values may be determined based on the information in the historical data store. Each mode value may represent a frequency with which a predetermined condition occurs in the data from previous communications in the historical data store.

Each context information item may be given a different weight score and a coefficient value may be determined for each context information item based on a corresponding mode value. Both the weight score and the coefficient value may be used to determine a total risk score. An example illustration of determining the risk score is described below.

The correlation engine 602 may compute e.g. the top ten mode values for the sender in terms of e.g. the hour value of sent time of the digital communication. The $1^{st}$ mode value, e.g. most frequently used hour, is given a mode score of 1, whereas the $10^{th}$ mode value is given a mode score of 10. The coefficient value is derived based on the formula below:

Coefficient value=mode score−1

A coefficient value may range from 0 to 9 in the event that ten mode values are used. The range of the coefficient values may vary in different embodiments. The coefficient value may include a value, e.g. 20, for contextual variable values that lie outside the top ten mode values. In different embodiments, the coefficient value for contextual variable values that lie outside the top ten mode values may be different.

If the sent hour of the digital communication matches the $1^{st}$ mode value, a value of 0 may be assigned as the coefficient value. If the sent hour of the digital communication matches the second mode value, a value of 1 may be assigned as the coefficient value. If the sent hour does not match any of the top ten mode values, a value of 20 may be assign as the coefficient value.

After the coefficient values of all the context information items are assigned, the correlation engine 602 may calculate the risk score of the inspected digital communication using the following formula:

Risk Score=($CV$1 weight score*coefficient 1)+($CV$2 weight score*coefficient 2)+ . . . +($CV$10 weight score*coefficient 10)

If the risk score is below a risk threshold value, the current inspected digital communication may be deemed to be low risk. If the risk score matches or exceeds the threshold value, the current inspected digital communication may be deemed to be high risk and appropriate actions may be applied. The risk threshold value may be adjustable for individual organizations.

Figure 9:
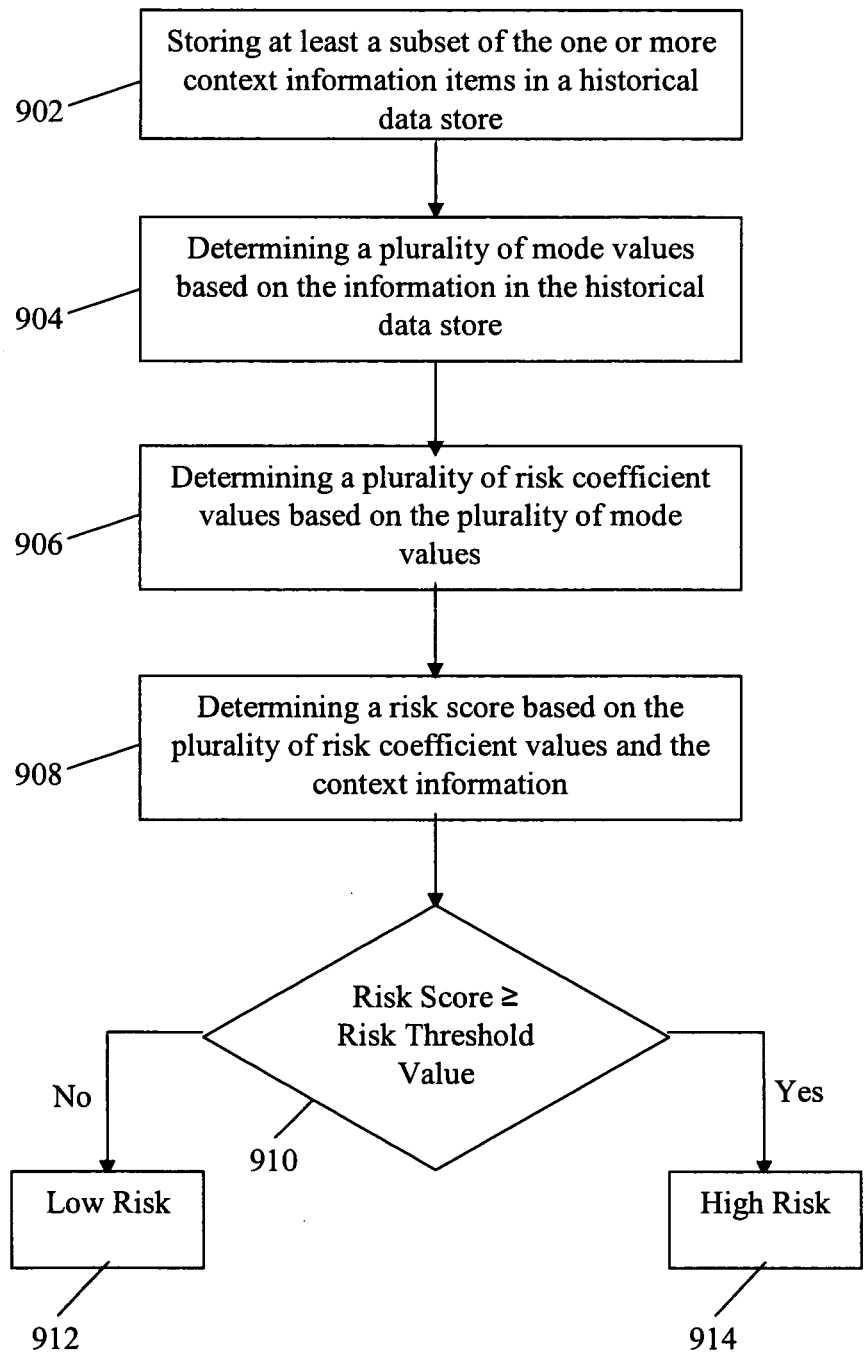
FIG. 9 shows a flowchart of process steps for determining the security risk of the inspected digital communication according to another embodiment of the invention.

FIG. 9 shows a flowchart of process steps for determining the security risk of the inspected digital communication under the Type 2 correlation analysis.

In 902, at least a subset of the one or more context information items is stored in a historical data store. The security risk may be determined based on at least in part on the data stored from previous communications stored in the historical data store. In 904, a plurality of mode values based on the information in the historical data store may be determined. Each mode value may represent a frequency with which a predetermined condition occurs in the data from previous communications in the historical data store. In 906, a plurality of risk coefficient values based on the plurality of mode values may be determined. In 908, a risk score based on the plurality of risk coefficient values and the context information may be determined.

In 910, the risk score may be checked to determine if the risk score is below a risk threshold value or matches or exceeds the risk threshold value. If the risk score is below the risk threshold value, the inspected digital communication may be deemed to be low risk in 912. If the risk score matches or exceeds the risk threshold value, the inspected digital communication may be deemed to be high risk in 914 and appropriate actions, e.g. sending an alert to at least one device connected to the internal network, may be applied.

An example scenario is described below to illustrate how the context-aware correlation engine may operate in real-life.

Through the correlation rule editor for Type 1 correlation analysis, the administrator may configure the system such that each developer may be allowed to email small bits of their code, for example up to 1 KB, to authorized technical advisers over a period of one week. Posts to developer forums can be subjected to more restrictive controls such as e.g. 500 bytes per week. Posting via instant messaging can be prohibited.

Type 2 correlation analysis may start when a developer, who has been posting e.g. no more than 200 bytes of source codes per week to SITE A during office hours for the past 1 month, begins to send e.g. 300 bytes of source codes to SITE B after office hours.

For both Type 1 and Type 2 correlation analysis, when the inspected digital communication is deemed to be high risk, an alert may be sent to at least one device connected to the internal network. The network gateway device 704 may be configured to send the alert. An alert message that causes a device on the internal network to log the sending of the digital communication may be sent. The management device 706 may be configured to receive the alert message, and to display the alert message to a user. An alert message and information on the content of the digital communication may also be sent to the management device 706 on the internal network. The information on the content of the digital communication may be encrypted so that the information cannot be viewed by a system manager without authorization from management. A public key encryption algorithm may be used to encrypt the information. Further, the digital communication may be quarantined by storing it on a device on the internal network. Sending of the message to the external network may also be blocked. The network gateway device 704 may be configured to block the sending of the message.

Network Traffic Analyzer

As discussed above with reference to FIG. 6A, the network gateway device 704 may include a network traffic analyzer 606. The network traffic analyzer 606 may integrate with enterprise directory and Dynamic Host Configuration Protocol (DHCP) servers to obtain the real user identities from the captured internet protocol (IP) addresses or machine hostnames. For example, the network traffic analyzer 606 may include an identity resolution module (not shown) which obtains the identity of the sender from the source IP address and content of the captured digital communication. Further, the reporting hierarchy, i.e. the reporting officer, for each user may also be extracted from the enterprise directory. This may facilitate the automatic escalation of detected incidents to the appropriate supervisor.

An embodiment of the invention provides a method for obtaining the actual identity of the sender of the digital communication. Such a process may be used, for example, by the network traffic analyzer 606 discussed above with reference to FIG. 6A. "User Name" may be obtained from e.g. MICROSOFT® ACTIVE DIRECTORY® technology Windows Event ID 672 with the source IP address of the captured digital communication. If "User Name" is not found, the digital communication may be checked to determine if it is of email type, regardless whether the digital communication is native or web-based. If the digital communication is of email type, user identity may be obtained by matching the extracted sender's email address against existing Identity-Relationship Database.

If the digital communication is not of email type, the digital communication may be checked to determine if it is of instant messaging type, regardless whether the digital communication is native or web-based. If the digital communication is of instant messaging type, user identity may be obtained by matching the extracted sender login ID against existing Identity-Relationship Database. If the digital communication is not of instant messaging type, the digital communication may be treated as from "Unknown" user and the relevant correlation rules may be applied accordingly.

Source Code Detection Module

The network gateway device 704 may include a source code detection module 604. The source code detection module 604 may be configured to detect source codes in accordance with the various embodiments of the invention described above. The source code detection module 604 may allow users to enjoy instant protection without the tedious effort of building the complex rules for each programming language.

Crawler Server

The crawler server 708 in FIG. 7, which may be named as "iGather", provides active monitoring and detection of leakages to external network. The crawler server 708 may operate by automatically logging into one or more of the network-accessible sites which may not be accessible to popular search engines and may be designated by a user, and performing search-and-filter activities. These network-accessible sites may not be accessible to popular search engines. These network-accessible sites may be designated by a user of the system 700.

The crawler server 708 may be connected with the source code repository 712 storing one or more source code modules, and the management device 706 that may interact with a user. The source code repository 712, the management device 706 and the crawler server 708 may be connected to an internal network, e.g. an internal network of an organization. The crawler server 708 may be connected to an external network, such as the Internet, to detect the leaked information in the external network.

The crawler server 708 may be configured to determine a set of unique identifying elements that identify a sensitive source code module accessed from the source code repository, search a list of one or more network-accessible sites for text that matches one or more of the unique identifying elements in the set of unique identifying elements to provide search results, and collect the search results in a memory of the crawler server. The crawler server 708 may also be configured to determine a relevancy for each of the search results based at least in part on a number of the unique identifying elements that were matched and on a number of search results, sort the results according to the relevancy, and send the results to the management device 706 to indicate to a user whether sensitive source code was found on the network-accessible sites.

The search-and-filter activities may be broken down into a plurality of phases, e.g. two phases in an embodiment of the invention. An initial search phase may be performed to list out a summary of results ranked in the order of relevance. Users may then review the summary results and instruct the Crawler server 708 to perform a more in-depth search of the selected initial results. Wherever possible, multiple search functions offered by the designated Internet sites are utilized by the Crawler server 708 to provide more accurate and comprehensive searches. All these activities can be performed on demand by the administrators or as scheduled.

Inputs to the online search can be manually entered or automatically derived by the Crawler server 708 after accessing protected information repositories and evaluating the protected content. For example, the Crawler server 708 can automatically access the central source code repository of an organization, extract the source codes, obtain the unique identifiers of the source codes and perform searches using the unique identifiers.

FIG. 10 shows an exemplary piece of source code 1000 named GeneralUtil.java for illustrating the detailed process of obtaining unique identifying elements.

From the above piece of source code 1000, a plurality of elements may be extracted and categorized into a plurality of element types. The extracted element types may include:
1) One-line comments
2) Declared Package names (for programming languages which support this)
3) Method names
4) Class names
5) File names Different element types may be used for categorizing the elements extracted from the source code in different embodiments. The number of element types may also be different in other embodiments.

Next, it is determined that whether the extracted elements are unique identifying element using a plurality of uniqueness rules. In an embodiment, the following two uniqueness rules may be applied:
1. Length of the element
2. Whether they are included in a blacklist of common/generic words.

Different uniqueness rules may be used in different embodiments. The number of uniqueness rules may also be different in other embodiments.

Either one uniqueness rule or a combination of uniqueness rules may be applied to each type of element type. In an example, the following combination of uniqueness rules may be applied:
1. One-line Comments—the uniqueness rule "Length of the element" may be applied
2. Declared Package Names—the uniqueness rule "Length of the element" may be applied, starting (in some embodiments) with a hierarchy of 2 levels, e.g. "com.mycompany". An example element extracted from the source code 1000 is "insight.common".
3. Method Names—the uniqueness rule "Length of the element" or "comparison against blacklist" may be applied
4. Classes Names—the uniqueness rule "Length of the element" or "comparison against blacklist" may be applied
5. File Name—the uniqueness rule "Length of the element" or "comparison against blacklist" may be applied From the above source code, the extracted elements are filtered and classified as unique identifying elements or generic elements, as shown in Table 1 below.

The three columns respectively show the various element types, the elements determined as generic, and the elements determined as unique identifying elements. For example, the elements categorized as "One-line Comments", i.e. "this is my comment for the interestingMethodAction" and "Gets today's date", are determined to be unique identifying elements. The elements of the type "Declared Package Names", i.e. "insight.common" and "insight.common.util", are determined as unique identifying elements. The element of the type "Method Names", i.e. "InterestingMethodAction", are determined as a unique identifying element. These elements may have a length above a predetermined length threshold if the uniqueness rule "Length of the element" is applied.

Elements, such as the "GetCurrentDate" of element type "Method names" may be compared with the blacklist of common/generic words and determined as a generic element. Elements whose name length is below a predetermined length threshold, such as "getID" and "setID", may also be excluded to improve the accuracy of the search and to reduce false positives.

TABLE 1

List of Element Types in Descending Order of Relevance

| Type of Element | Too Generic | Unique |
|---|---|---|
| One-line comments | | "this is my comment for the interestingMethodAction" "Gets today's date" |
| Declared package names | | "insight.common" "insight.common.util" |
| Method names | GetCurrentDate (discarded by blacklist) | InterestingMethodAction |
| Classes names | GeneralUtil (discarded by blacklist) | |
| File name | GeneralUtil (discarded by blacklist) | |

Once all the unique elements are obtained, the crawler server 708 may proceed to perform searches with a plurality of combinations of the unique identifying elements. Searches may be performed in a descending of relevance, starting with the highest relevance, i.e. matches to all unique identifying elements. The system may perform searches starting from the more relevant element type of "One-line comments" to the less relevant element type of "File names", as listed in TABLE 1. In an example, there are 31 types of combination searches from the 5 elements types that the system analyzes, which are listed below.

Types of Combinations:

$1^{st}$: All One-line Comments+All Packages+All Methods+All Classes+File name=Highest relevance $2^{nd}$: 0 One-line Comments+All Packages+All Methods+All Classes+File name $3^{rd}$: 0 One-line Comments+0 Packages+All Methods+All Classes+File name

...

$31^{st}$: 0 One-line Comments+0 Packages+0 Methods+0 Classes+File name=Least relevance After a specific combination search is completed, the next unique identifying element in the same element type is be used for the subsequent combination search. To reduce the number of results, the user may configure a limit to the maximum number of results returned from each combination search.

Once the search results are obtained, the search results may be ranked in a descending order of relevancy. Relevancy is computed using the following formula:

Relevancy value=CombinationPoints/Total-SearchResults where

CombinationPoints=(One-Line Comment*Points per comment)+(Declared Package Name*Points per package)+(Method Name*Points per method)+(Class Name*Points per class)+(File Name*Points per filename)

and

TotalSearchResults=the number of results retrieved when searching using that combination.

CombinationPoints are divided by TotalSearchResults to provide higher weight to combinations that result fewer results, i.e. more unique. For example:

Case 1: Calculation for a combination search using one Class Name which returns 100 records Relevancy value=(0*25)+(0*18)+(0*13)+(1*10)+ (0*2)/100=0.1

Case 2: Calculation for a combination search using one File Name which returns 1 record Relevancy value=(0*25)+(0*18)+(0*13)+(0*10)+ (1*2)/1=2

In this example, the result from the later case is ranked higher in terms of relevancy than the result from the former case though the former case uses a more relevant element type.

Figure 11:
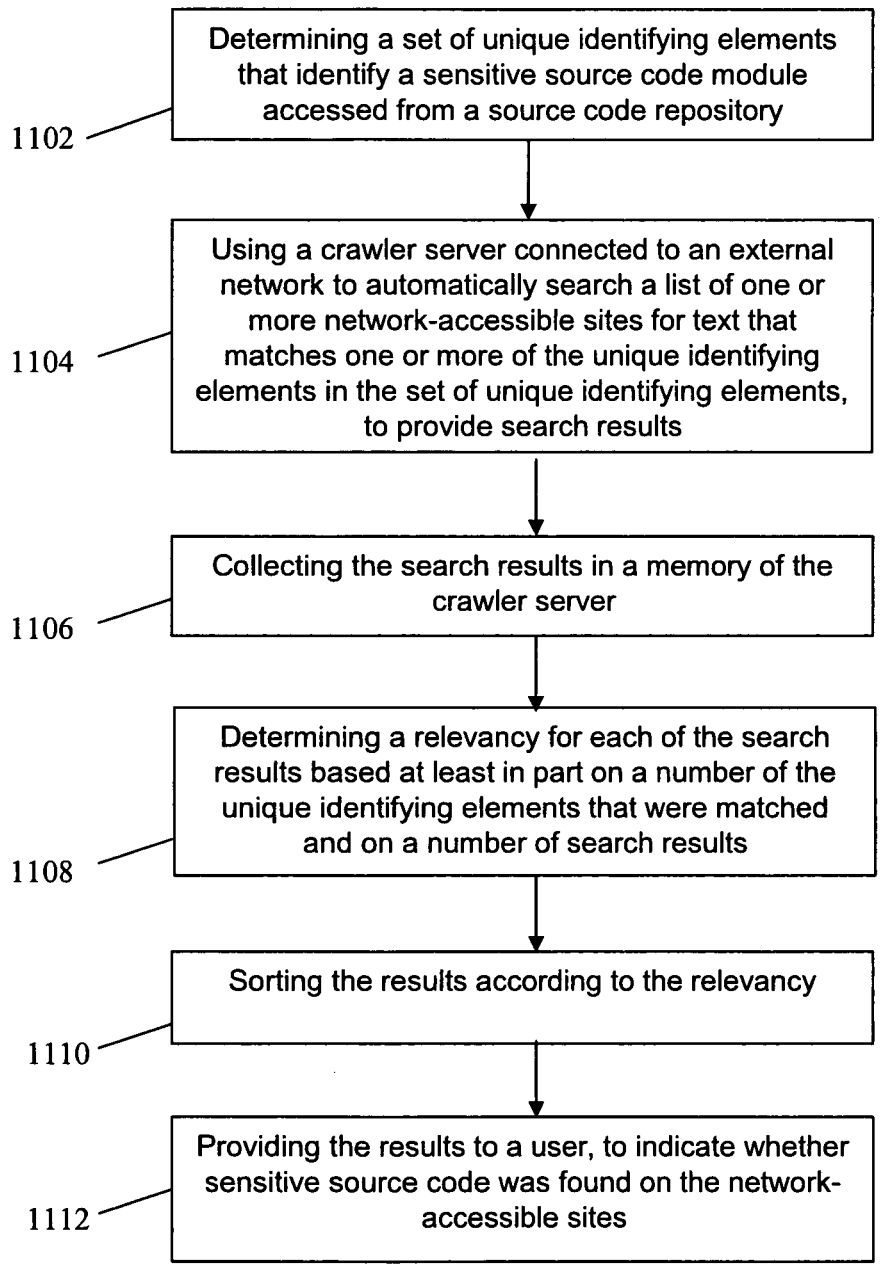
FIG. 11 shows a flowchart of a process for detecting leakage of sensitive source code on network-accessible sites according to an embodiment.

FIG. 11 shows a flowchart of a process for detecting leakage of sensitive source code on network-accessible sites according to an embodiment. In 1102, a set of unique identifying elements that identify a sensitive source code module accessed from a source code repository may be determined. In 1104, a crawler server connected to an external network to automatically search a list of one or more network-accessible sites for text that matches one or more of the unique identifying elements in the set of unique identifying elements, may be used to provide search results. In 1106, the search results may be collected in a memory of the crawler server. In 1108, a relevancy for each of the search results may be determined based at least in part on a number of the unique identifying elements that were matched and on a number of search results. In 1110, the results may be sorted according to the relevancy. In 1112, the results may be provided to a user, to indicate whether sensitive source code was found on the network-accessible sites.

Identity-Relationship Database

The embodiments of the invention also provide traceability of source of leakages through its ability to build a web of relationships between the online identities that leak the confidential information to internal user identities, i.e. to build an identity-relationship database. The identity-relationship database may be built by integrating identities collected by the network gateway device 704 which collects identities captured from within the organization and identities collected by the Crawler server 708 which collects identities captured from Internet sites. This capability is critical for identifying sources of leakages to popular Internet sites such as blogs, social networking sites and forums.

Internal network identities may be collected from internal sources within the organization. For example, network identities which are of interest to be extracted may include the identities used by employees for accessing instant messaging, personal email, forums, social networking sites, blogs and other Web-based services (including, for example, Web 2.0 services). The collected internal network identities may be linked to their respective users, i.e. the employees. The collected internal network identities may also be linked to the internal corporate identities by resolving against the organization's directory and network servers.

Counter-part identities of intercepted traffic, e.g. intercepted message, may also be captured. These counter-part identities may be network identities of intended recipient(s) of the message, which may be identities within the internal network or identities in the external network. The network identities of the intended recipient(s) of the message may be considered as the first layer of friends of the internal user in the identity-relationship database. Building of the identity-relationship database may include recording the frequency of communication between the network identity of the message sender and the intended recipient(s).

When the crawler server 708 detects leakages of protected information, of which the process is described above, the crawler server 708 captures profile of the poster of the digital information and profiles of all parties related to the poster. The profiles may include network identities of the users, and may be matched partially or completely when determining the source of the leaked information.

In an embodiment, the online identity of the person leaking the information may be captured by the crawler server 708. If the online identity is present in the identity-relationship database, the possible source(s) of leakage can be traced immediately. If the online identity is not present in the database, the crawler server may attempt to build the second and subsequent "layers of friends" for the online identity in question. Sources of information to build the "layers of friends" may include but may not be limited to social networking sites, blog sites, discussion forum sites, other sites that permit posting of messages and contents, external e-mail and instant messaging sites. When there is a match between the "layers of friends" for the online identity who leaked the protected information and those for internal users, the "layers" may be merged and the online identity may be linked to the relevant internal users. If there is still no match beyond a threshold number of "layers", the closest yet not linked layers may be shown to the administrator for manual evaluation and judgement.

Figure 12:
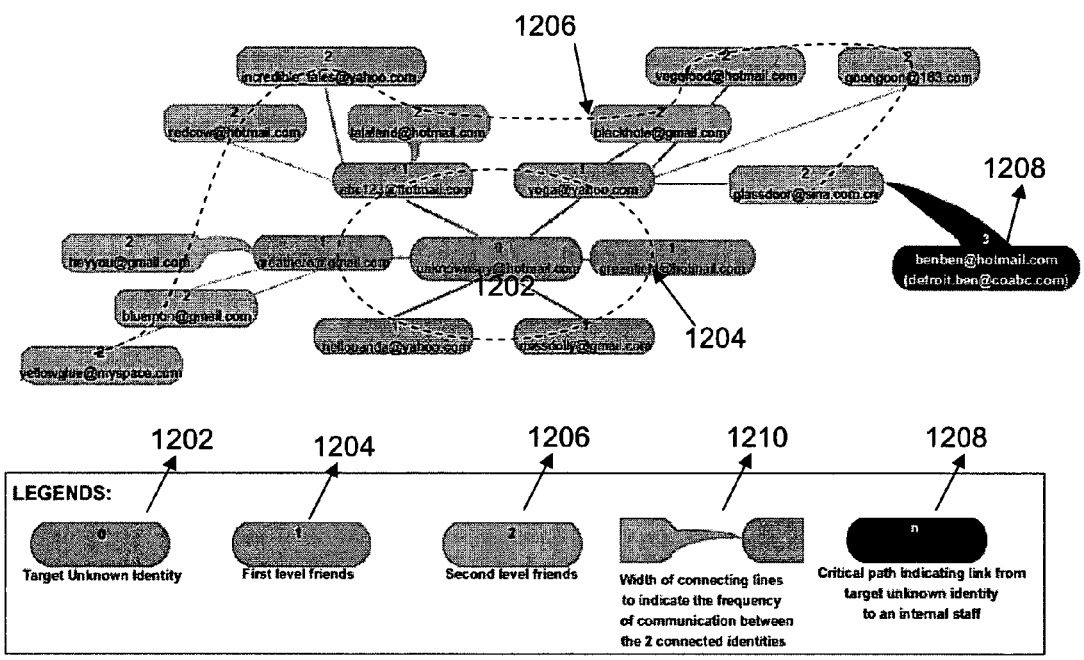
FIG. 12 shows an identify relationship graph according to an embodiment of the invention.

FIG. 12 shows an identify relationship graph according to an embodiment of the invention.

A target unknown identity 1202 may be linked to its first layer of friends 1204 and second layer of friends 1206. The target unknown identity 1202 may be an internal identity or an external identity. In this example, the target unknown identity 1202 is the network identity of a poster of the leaked information on the external network. An internal network identifier 1208 may be linked to the target unknown identity 1202. By identifying the link from the target unknown identity 1202 to the internal network identifier 1208, the internal network identifier 1208 may be identified as a possible source of the leaked information.

Building of the identity-relationship database may further include determining a closeness of a connection between a first network identity and a second network identity. Determining a closeness of a connection may include determining a type of a detected relationship, wherein each type of detected relationship may be associated with a proximity value that is used to determine the closeness. The proximity value may represent the distance between the two identities, as shown in FIG. 12. Examples of the types of detected relationships that can be used to determine a closeness of a connection may include but may not be limited to:

1) the first network identity and the second network identity are declared friends on a social networking site;
2) the first network identity and the second network identity send personal communications to each other via instant messaging;
3) the first network identity and the second network identity send personal communications to each other via email;
4) hyperlinks exist between a blog of the first network identity and a blog of the second network identity;
5) the first network identity has posted a comment on a blog of the second network identity;
6) the first network identity and the second network identity have communicated via corporate email; and 7) the first and second network identities have both posted messages in the same thread on a blog and/or discussion forum.

The proximity values for the above types of detected relationships may be arranged in a descending order to determine the closeness of two identities. For example, a pair of identities, who had communicated via personal email (i.e. type 3), may have a higher proximity value and thus may be closer than a pair of identities who had communicated via corporate email (i.e. type 6). In this example, the highest possible proximity may be a declared friend as gathered from the social networking sites (e.g. type 1), whereas the lowest possible proximity is shared postings to a common message thread in online forums (i.e. type 7).

Other types of detected relationships may also be used to determine the closeness of a connection in different embodiments.

Determining a closeness of a connection may include determining a frequency of communication between the first network identity and the second network identity. As shown in FIG. 12, the frequency of communications may determine the thickness of the relationship links 1210.

The degree of closeness between various identities may be ranked based on the type of detected relationships and the frequency of communications. The closeness of a connection between two network identities may be used in the identification of a possible source of the leaked information. Identifying an employee as a possible source of the leaked information may include using the closeness of the connections between the employee and the network identity of the poster of the leaked information to determine a likelihood that the employee is the source of the leaked information.

Figure 13:
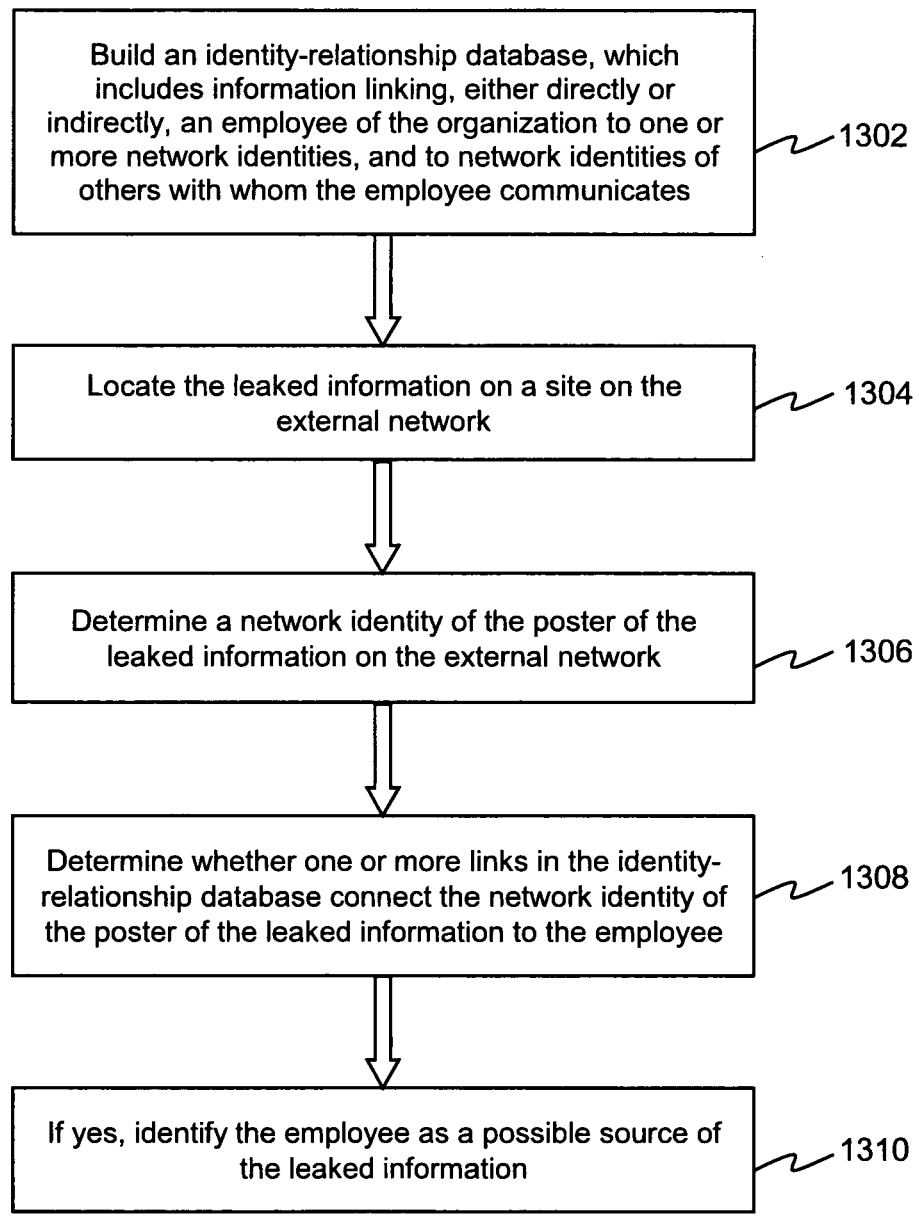
FIG. 13 shows a flowchart of a process for tracing a source of leaked information owned by an organization after the information has been leaked on an external network according to an embodiment.

FIG. 13 shows a flowchart of a process for tracing a source of leaked information owned by an organization after the information has been leaked on an external network according to an embodiment. In 1302, an identity-relationship database may be built, wherein the identity-relationship database may contain information linking, either directly or indirectly, an employee of the organization to one or more network identities, and to network identities of others with whom the employee communicates. In 1304, the leaked information may be located on a site on the external network. In 1306, a network identity of the poster of the leaked information may be determined on the external network. In 1308, it may be determined whether one or more links in the identity-relationship database connect the network identity of the poster of the leaked information to the employee. In 1310, if the one or more links connect the network identity of the poster of the leaked information to the employee, the employee may be identified as a possible source of the leaked information.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of detecting source code in a message being sent over a digital communication network to secure against unauthorized leakage of source code, the method comprising:
   intercepting the message on a network device;
   placing the message into a memory on the network device;
   dividing the message in the memory into one or more segments, each segment including a predetermined number of lines of text from the message;
   for each segment, applying one or more syntax rules of a programming language to the segment together with a predetermined number of context lines of text before the segment and/or after the segment, to determine which of the syntax rules of the programming language are matched in the segment, wherein the applying of the one or more syntax rules includes providing a coefficient for each of the one or more syntax rules and applying the one or more syntax rules in an order from highest coefficient to lowest coefficient, the coefficient for each syntax rule being based at least in part on the uniqueness of that syntax rule in its programming language; and
   providing a determination of whether the message includes source code based on the syntax rules that were matched.

2. The method of claim 1, further comprising applying a sliding window offset to the start of each of the one or more segments, and repeating the application of the one or more syntax rules to each segment.

3. The method of claim 1, wherein an administrator preselects the programming language for which the one or more syntax rules are applied to each segment.

4. The method of claim 1, further comprising repeating the application of the one or more syntax rules to each segment for syntax rules of a plurality of programming languages.

5. The method of claim 4, wherein an administrator selects an order in which the plurality of programming languages will have their one or more syntax rules applied to each segment.

6. The method of claim 4, wherein an order in which the plurality of programming languages will have their one or more syntax rules applied to each segment is determined according to a market survey of the popularity of programming languages.

7. The method of claim 1, wherein applying the one or more syntax rules comprises computing a product of the coefficient for a syntax rule and the number of characters of text in the segment that match that syntax rule.

8. The method of claim 7, wherein providing the determination of whether the message includes source code comprises computing a ratio based on the product for each syntax rule and the number of characters of text in each segment.

9. The method of claim 8, wherein applying one or more syntax rules stops if the ratio exceeds a predetermined threshold that indicates a likelihood that the message includes source code.

10. The method of claim 1, wherein the message is encoded, and the method further comprises decoding the message.

11. The method of claim 1, further comprising sending an alert message if it is determined that the message includes source code.

12. A system for securing against leakage of source code, the system comprising:
   a network device connected to a network, the network device configured to intercept a message on the network and store the intercepted message in a memory on the network device;
   the network device further configured to detect source code in the message by:
      dividing the message in the memory into one or more segments, each segment including a predetermined number of lines of text;
      for each segment, applying one or more syntax rules of a programming language to the segment together with a predetermined number of context lines of text before the segment and/or after the segment, to determine which of the syntax rules of the programming language are matched in the segment, wherein the applying of the one or more syntax rules includes providing a coefficient for each of the one or more syntax rules and applying the one or more syntax rules in an order based on their coefficients, the provided coefficient for each syntax rule being based at least in part on the uniqueness of that syntax rule in its programming language; and providing a determination of whether the message includes source code based on the syntax rules that were matched;

and the network device further configured to take an action to secure against unauthorized leakage of source code if it is determined that the message includes source code.

13. The system of claim 12, wherein the network device is further configured to detect source code in the message by repeating the application of the one or more syntax rules to each segment for syntax rules of a plurality of programming languages.

14. The system of claim 12, wherein the network device is further configured to detect source code in the message by computing a product of the coefficient for a syntax rule and the number of characters of text in the segment that match that syntax rule.

15. The system of claim 14, wherein the network device is further configured to detect source code in the message by computing a ratio based on the product for each syntax rule and the number of characters of text in each segment, and by using the ratio to determine whether the segment contains source code.

16. The system of claim 15, wherein the network device is further configured to detect source code in the message by stopping application of the one or more syntax rules if the ratio exceeds a predetermined threshold that indicates a likelihood that the message includes source code.

17. The system of claim 12, wherein the message is encoded, and wherein the network device is configured to decode the message.

18. The system of claim 12, wherein the action to secure against unauthorized leakage of source code comprises sending an alert message to a device on the network if it is determined that the text message includes source code.

* * * * *